(12) United States Patent
Wiemers et al.

(10) Patent No.: US 8,524,082 B2
(45) Date of Patent: Sep. 3, 2013

(54) MECHANICAL AXIAL VIBRATION IN MEMBRANE SEPARATION TREATMENT OF EFFLUENTS

(75) Inventors: Reginald A. Wiemers, Littleton, CO (US); Robert Kohlheb, Göttingen (DE)

(73) Assignee: Rockwater Resource LLC, Denver, CO (US)

( * ) Notice: Subject to any disclaimer, the term of this patent is extended or adjusted under 35 U.S.C. 154(b) by 518 days.

(21) Appl. No.: 12/452,778

(22) PCT Filed: Jul. 31, 2008

(86) PCT No.: PCT/US2008/009249
§ 371 (c)(1),
(2), (4) Date: Jan. 22, 2010

(87) PCT Pub. No.: WO2009/017785
PCT Pub. Date: Feb. 5, 2009

(65) Prior Publication Data
US 2010/0116736 A1      May 13, 2010

Related U.S. Application Data

(63) Continuation of application No. 11/888,512, filed on Aug. 1, 2007, now abandoned.

(51) Int. Cl.
*B01D 63/16* (2006.01)
*B01D 63/02* (2006.01)
*B01D 65/02* (2006.01)

(52) U.S. Cl.
USPC ............ 210/321.67; 210/321.75; 210/321.84; 210/650; 210/321.79; 210/321.88; 210/327; 210/388

(58) Field of Classification Search
None
See application file for complete search history.

(56) References Cited

U.S. PATENT DOCUMENTS

| | | | | |
|---|---|---|---|---|
| 3,455,821 A | * | 7/1969 | Aremaa | 210/414 |
| 6,322,698 B1 | * | 11/2001 | Rios et al. | 210/321.75 |
| 2005/0023207 A1 | * | 2/2005 | Kirker et al. | 210/321.74 |
| 2006/0108289 A1 | * | 5/2006 | Steele et al. | 210/651 |
| 2006/0180540 A1 | * | 8/2006 | Colby et al. | 210/321.74 |

* cited by examiner

*Primary Examiner* — Krishnan S Menon
(74) *Attorney, Agent, or Firm* — Harold A. Burdick

(57) ABSTRACT

Apparatus and methods are disclosed for mechanical axial vibration in membrane separation treatment processes. The apparatus includes a separation membrane element having an axial dimension, a membrane support structure having the element therein, and means for vibrating the membrane element (hydrodynamically or using motors) in the axial dimension.

18 Claims, 21 Drawing Sheets

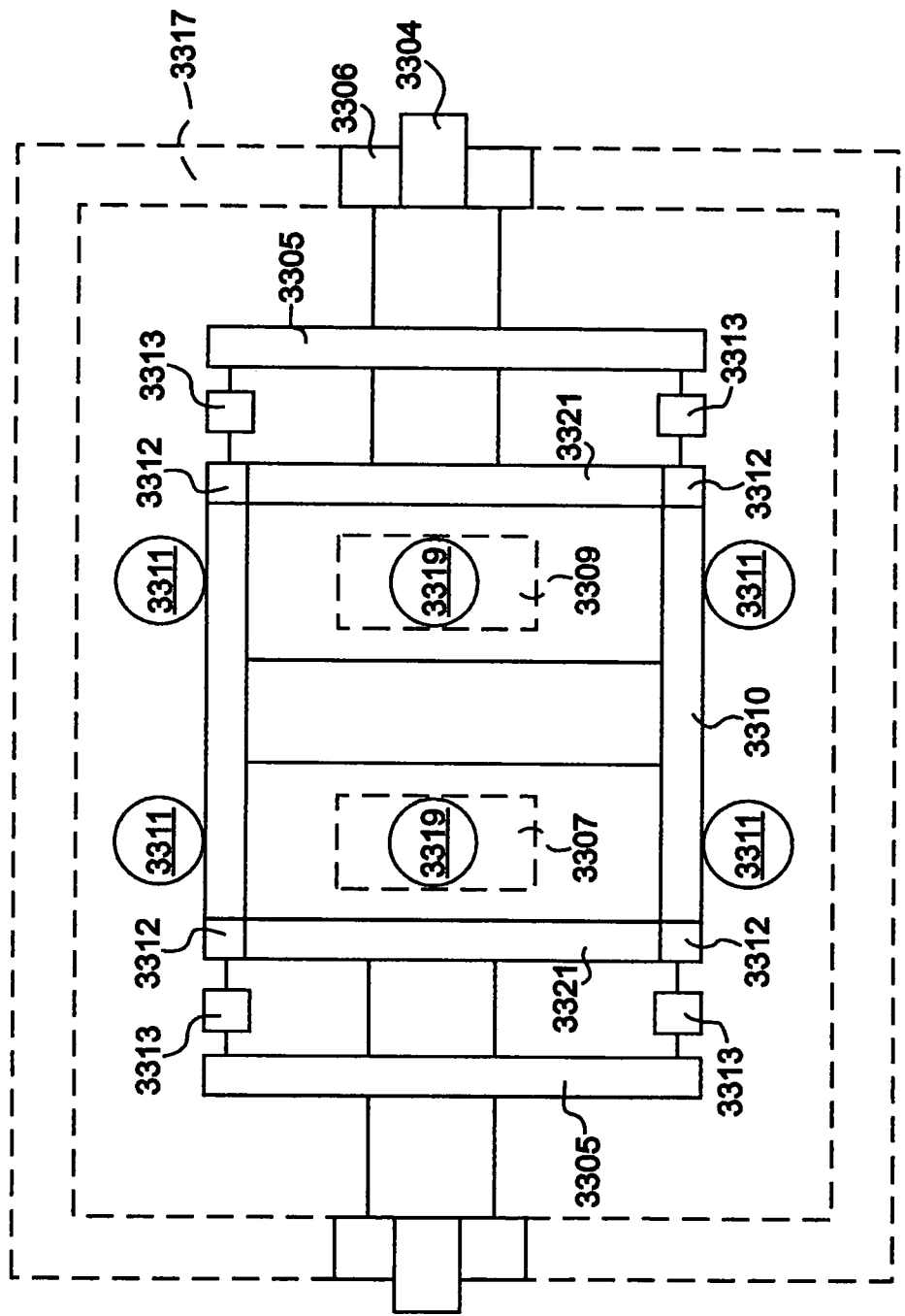

MECHANICAL AXIAL VIBRATION IN MEMBRANE SEPARATION TREATMENT OF EFFLUENTS

RELATED APPLICATION

This Application is a continuation of U.S. patent application Ser. No. 11/888,512 filed Aug. 1, 2007 by inventors including the inventors herein which application is pending on the filing date of this Application.

FIELD OF THE INVENTION

This invention relates to effluent treatment, and, more particularly, relates to membrane separation treatment of effluents.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

Filtering by membrane separation techniques is known. Membrane elements in such use require constant maintenance and frequent cleaning or replacement. Vibratory means have been heretofore known and/or utilized in membrane separation to reduce maintenance requirements. These have employed horizontal vibratory one source only custom membrane modules. Further improvements could thus still be utilized.

SUMMARY OF THE INVENTION

This invention provides apparatus and methods for mechanical (motorized or hydrodynamic) axial vibration in membrane separation treatment of effluents. The apparatus may make use of readily available, and thus less costly, conventional membrane elements and/or modules. Axial, linear operation allows mounting of membrane modules in a vertical flow gravity assisted position, with adjustable crossflow operation accommodated.

The apparatus includes a separation membrane element having an axial dimension, a membrane support structure having the element therein, and means for vibrating the membrane element in the axial dimension. Crossflow pumping is connected with the support structure. In one embodiment, the support structure includes a membrane housing, the vibrating means including a fluid pump and spring arrangement for oscillating the membrane element. In another embodiment, the support structure includes a tube for receiving and securing the membrane element, the tube and element together defining a membrane cartridge, the cartridge axially mounted in a containment housing and movable axially therein by the vibrating means. In yet another embodiment, the vibrating means are motors for vibrating a plurality of elements on a common platform.

The methods of this invention include the steps of locating a membrane element in a support structure, feeding effluent for treatment into the support structure and axially vibrating the membrane element in the support structure. Treated effluent is then withdrawn from the support structure.

Vibration direction is axial and preferably perpendicular to the floor of the installation for gravity assisted membrane separation systems. The shear wave produced by axial vertical membrane vibration causes solids and foulants to be lifted off membrane surfaces and remixed with retentate flowing through the parallel or tunnel spacer or other specially designed spacers of spirally wound elements or through flow channels of tubular or capillar membrane elements. Movement continuity is maintained through adjustable crossflow, reducing further additional membrane fouling tendency. The vibration curve is preferably a regular curve, which corresponds mathematically to a zero centered sine or cosine, a sinusoidal or simple harmonic. The amplitude is preferably steady and frequency high.

It is therefore an object of this invention to provide apparatus and methods for mechanical axial vibration in membrane separation treatment of effluents.

It is another object of this invention to provide apparatus and methods for mechanical axial vibration in membrane separation treatment of effluents that makes use of readily available, conventional membrane elements and/or modules.

It is another object of this invention to provide apparatus for mechanical axial vibration in membrane separation treatment of effluents accommodating mounting of membrane modules in a vertical flow gravity assisted position and/or adjustable crossflow operation.

It is still another object of this invention to provide a membrane separation apparatus utilizing axial vibration for treatment of effluents that includes a separation membrane element having an axial dimension, a membrane support structure having the element therein, and vibrating means for vibrating the membrane element in the axial dimension.

It is yet another object of this invention to provide a method for axial vibration in membrane separation treatment of effluents that includes the steps of locating a membrane element in a support structure, feeding effluent for treatment into the support structure, axially vibrating the membrane element in the support structure, and withdrawing treated effluent from the support structure.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 11a and 11b are diagrams illustrating a high frequency oscillating membrane system utilizable in primary treatment of this invention;

DESCRIPTION OF THE INVENTION

Figure 1:
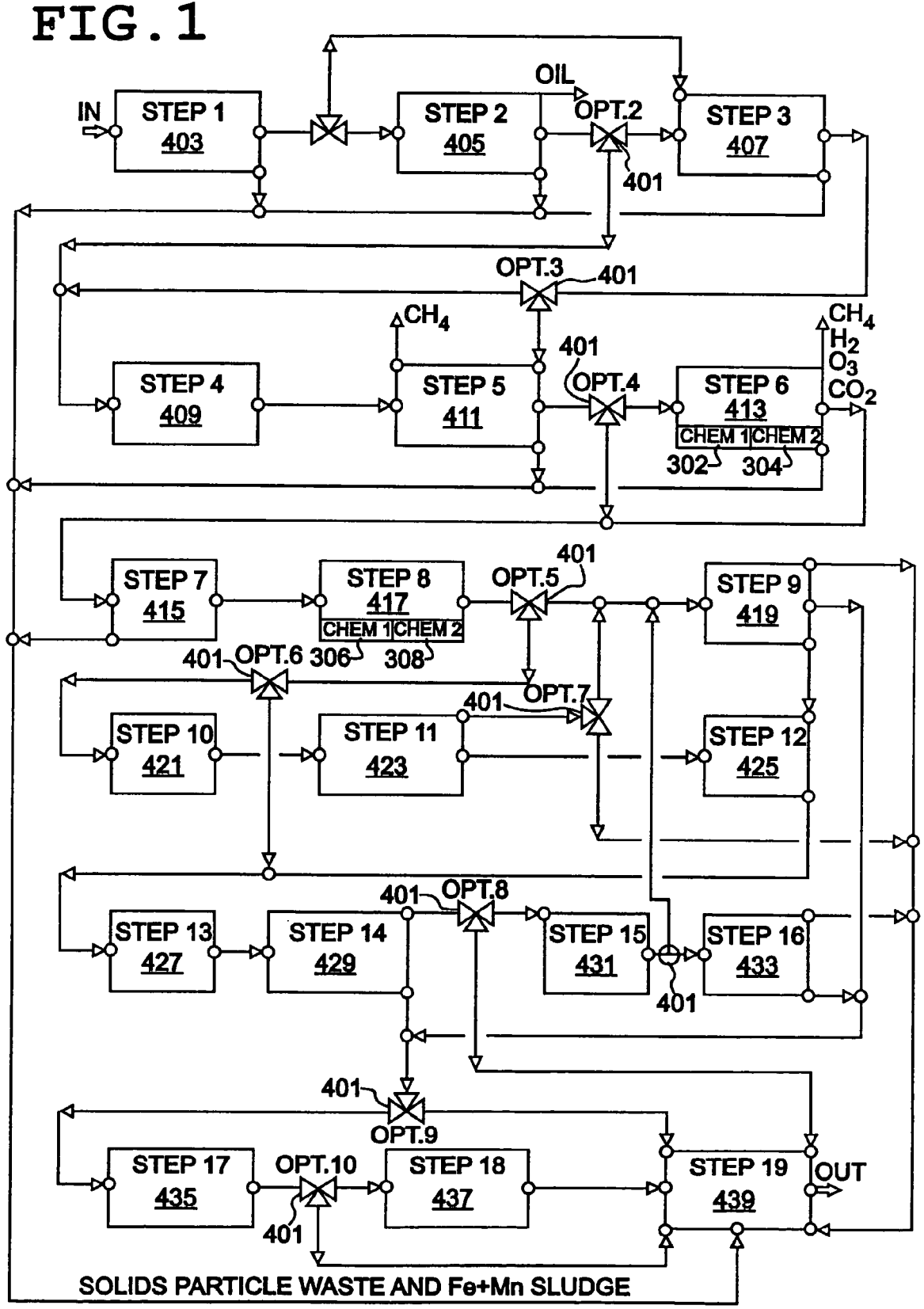
FIG. 1 is a block diagram illustrating phased functions in an effluent treatment regime.

As background, FIG. 1 shows steps of an effluent treatment regime. The option numbers located at three-way valves 401 refer to automated or override manual flow control options for different treatment regimes. Stage 403 (step 1) is a dual strainer receiving feed effluent and removing particulates down to about 500 μm (for example, the model 120 dual strainer produced by Plenty Products, Inc.). Stage 405 (step 2) provides oil separation from the feed flow utilizing a separator (for example, a Highland Tank & Mfg. Co. R-HTC Oil/Water Separator with Petro-Screen and parallel corrugated plate coalescers). Stage 407 (step 3) is an automatic backflush filter providing particle removal down to the 100 μm range or better (a TEKLEEN self cleaning bell filter setup with GB6 electric controller by Automatic Filters, Inc., or similar filter setups by Amiad Filtration Systems, could be utilized for example).

Stage 409 (step 4) provides inline direct feed effluent (water) heating. Feed water heating is required in many treatment settings due to seasonal operations, and further benefits many downpipe treatment options by breaking feed water alkalinity, enhancing $CH_4$ gas removal, ensuring proper membrane (where present) permeate flux for an overall constant permeate flow yield, and the like. Either of two types of inline heating systems may be utilized, as more fully detailed below.

Stage 411 (step 5) is a first suite of pre-treatment apparatus including eight apparatus (all eight are preferred, but fewer could be provided in some applications). These apparatus provide, as more fully detailed below, on-line diffusive effect (ODE) membrane aeration, fluid density reduction, modified vacuum tower or cascade series waterfall degassing, air stone degassing, modified venturi gas evacuation, fine filtration, lamella plate clarification, and sludge chamber concentration.

Stage 413 (step 6) is a second suite of pre-treatment apparatus including ten apparatus (all ten are preferred, but fewer could be provided in some applications). This stage provides pH adjustment (via an injection pump 302), chemical dosing (via an injection pump 304, ODE/IDI (inline diffusive ionization) membrane aeration, ionized air/gas treatment, electrocoagulation, dissolved air/gas flotation, vacuum introduced cyclone separation, vacuum degassing, lamella plate clarification, and sludge chamber concentration.

Stage 415 (step 7) provides a bag filter and/or belt filter assembly (for example, fabric filtration systems sold by SERFILCO) for filtration down to about the 1 μm range. Stage 417 (step 8) is a homogenizing and buffer tank with pH adjustment and chemical dosing (at injection pumps 306 and 308, respectively). Stage 419 (step 9) is the first of the primary, effluent polishing treatment array (stages 419 through 433, steps 9 through 16), and may include any of several membrane treatment apparatus in accord with this invention as more fully detailed hereinafter providing nanofiltration, and/or known ion-exchange treatment technology. Stage 419, as is apparent, is an option for up-concentrating effluent to increase overall flow yield.

Stage 421 (step 10) provides antifouling and antiscaling chemical treatment to prevent fouling and scaling of membranes by keeping low molecular weight components in solution (foremost of which are divalent and multivalent cations). Known variable speed tubing pumps could be utilized for insertion. Stage 423 (step 11) provides filtration for removal of low molecular weight components (Al, Fe, Mg and Mn, for example) and/or colloidals utilizing membrane treatment nanofiltration and/or ion-exchange treatment. Stage 425 (step 12) provides a buffer tank for step 14 for process flow control (for example a Snyder horizontal leg tank by Harrington). Stage 427 (step 13) provides antiscaling chemical treatment addressing monovalent and a few divalent cations and anions (Ba, Ca, Na, Sr, $CO_3F$, $HCO_3$, and $SO_4$ for example). Again, known variable speed tubing pumps could be utilized for insertion.

Stage 429 (step 14) addresses removal of low molecular weight components (salts, for example) utilizing reverse osmosis membrane treatment and/or ion-exchange treatment. Stage 431 (step 15) is a high pressure buffer tank providing flow control for step 9 and/or 16. Stage 433 (step 16) provides up-concentration of concentrate flow from stage 429 to further increase flow yield, and may utilize reverse osmosis membrane treatment, ion-exchange treatment and/or high efficiency electrodialysis technology (for example, a HEED assembly by EET Corporation), a hybrid process including both electrodialysis and reverse osmosis approaches.

Stage 435 (step 17) is a suite of four post-treatment apparatus as more fully detailed herein below, and including activated carbon filtration for gas absorption (Ametic filter chambers by Harrington, for example), sodium absorption ratio compensation, utilizing a dolomite filter for example, UV treatment (for example, an SP or SL series unit from Aquafine Corporation), and membrane aeration for $O_2$ saturation (preferably utilizing an ODE system in accord with yet another aspect of this invention).

Stage 437 (step 18) provides bio-monitoring utilizing a 10 gallon aquarium with the operating volume passing through either a sterilizer or other aquarium device to prevent in situ bio-contamination from waste and nutrients. The sterilizer or other device must match the maximum produced permeate flow of at the rate of approximately one gallon per minute for real time bio-monitoring. Since the sterilized water is typically being mixed with unsterilized water, it is not possible to completely purify it, but a sterilized percentage exceeding 99.9% is acceptable for the bio-monitoring step sensitivity. Stage 439 (step 19) conventionally provides waste collection and purified feed return.

Regarding the ion-exchange treatment alternative at stages 419, 423, 429, and 433 (steps 9, 11, 14 and 16), this process is a well known water treatment process for removing ions from solution by exchanging cations or anions between the dissolved phase and counter ions on a matrix such as organic zeolite, in which $Ca_2^+$ ions in solution displace $Na^+$ ions in the zeolite, montmorillonite (a colloidal bentonite clay) or synthetically produced organic resins, for example.

An organic ion exchange resin is composed of high molecular-weight polyelectrolytes that can exchange their mobile ions for ions of similar charge from the surrounding medium. Each resin has a distinct number of mobile sites that set the maximum quantity of exchanges per unit of resin. Ion exchange reactions are stoichiometric and reversible.

Commercially available ion-exchange treatment technology can be utilized alone as an alternative to the hereinafter detailed membrane treatment technology or may supplement specific membrane technology. The implementation of ion-exchange technology depends on the specific application and project economics (the less complex and labor-intensive state of the art ion exchange technology may be used as a single polishing step instead of membrane treatment where cost is a factor and desired treatment outcomes warrant the tradeoff).

In some settings, primarily depending on the intended use of the purified water, complete deionization (replacement of all cations by the hydrogen ion as well as replacement of all anions by the hydroxide ion) may be required. In such case, commercial cation- and anion-exchange technology will be employed as a polishing treatment step alone or in addition to membrane treatment (again depending on the end-of-pipe outcomes desired). For example, a feed water with total dissolved solids of less than about 500 mg/L is ideally suited for ion exchange technology in combination with reverse osmosis membrane treatment. In other words, after membrane treatment at step 14 (429), the produced permeate is fed into a strongly acidic cation exchanger followed by a strongly basic anion exchanger (substituting for both steps 15 and 16). Such systems are commercially available from KINETICO, REMCO ENGINEERING and others.

Membrane treatment and other treatment systems (205 in some of the FIGURES), including stages 419 through 433 (steps 8 through 16), may be realized by deployment of various types of apparatus and systems, particularly at steps 9, 11, 14 and 16 (steps 8, 10, 12, 13 and 15 are primarily directed to homogenization and process buffering and/or chemical metering, and have been addressed hereinabove). Ion-exchange treatment and HEED systems utilizable herein have already been addressed. In addition V-SEP series L/P systems, while not preferred, could be utilized at stages 419, 423, 429 and 433 for analytics as well as nanofiltration and reverse osmosis filter installations.

At stage 419, high frequency nanofiltration systems as discussed hereinbelow could be employed. However, in accordance with one aspect of this invention, FIGS. 2 through 5 illustrate an axial (linear) vibratory membrane separation apparatus and methods for forward osmosis. This aspect of the invention relates to low amplitude, axial vibratory membrane separation apparatus (both nanofiltration and reverse osmosis filtration) called quaking recycle membrane separation technology employed with forward osmosis technology. Forward osmosis technology is employed to supplement the quaking membrane nanofiltration and/or reverse osmosis technology, the hybrid application incorporated into an integrated apparatus (high frequency forward nanofiltration or high frequency forward reverse osmosis apparatus).

Heretofore known forward osmosis technology uses the osmotic pressure differential across a membrane, rather than the hydraulic pressure differential, for filtration. The osmotic pressure differential is provided by a recyclable solute composed of a mixture of salts, the thermally recyclable salt solution called "draw solution". Draw solutions typically used include ammonium bicarbonate ($NH_4HCO_3$), ammonium carbonate ($NH_4)_2CO_3$, ammonium carbamate $NH_4NH_2CO_2$; ($H_4NO)(CONH_2$; $H_2N-CO-O-NH_4$), and can preferably include magnetoferritin in solution. The concentration of solutes in the thermally recyclable draw is required to have a higher osmotic pressure than the osmotic pressure of the concentration of solutes in the feed water (often brackish). Common spiral-wound membranes have not been heretofore utilized for forward osmosis because a liquid stream cannot be forced to flow on the support side (permeate side) inside the envelope, where the porous polymer layer further increases the internal concentration polarization. The apparatus of this aspect of the invention employs tubular or hollow fiber membrane modules, rather than spiral-wound membrane elements.

The hybrid quaking membrane plus forward osmosis process and apparatus of this invention secure permeate continuity of the present art forward osmosis technology (generating extreme turbulence on both sides of the forward osmosis membrane (feed side and draw side) to support permeate continuity), provide nondestructive, vibratory membrane separation for commercially available forward osmosis membranes, and reduce the potential tendencies of concentration polarization, scaling and fouling of forward osmosis membranes.

Turning to FIGS. 2 to 5, the hybrid quaking membrane plus forward osmosis process and apparatus is illustrated with the quaking membrane assembly at 2401 and recycle and reconcentrating closed loop system at 2501. In the combined apparatus, self-supported, semi-permeable or hollow fiber tubular membrane 2403 is used as a forward osmosis membrane operating in a quaking membrane process. Such tubular and hollow fiber membranes have no thick support layer as in spiral-wound, flat sheet, asymmetric membranes, thus minimizing internal concentration polarization. Membranes of this type are commercially available.

The quaking membrane process is low amplitude and high quaking frequency, generating low shear energy and therefore a gentle treatment in the epoxy potting compound of tubular or hollow fiber membrane 2403. The quaking energy significantly lowers already low external concentration polarization, and has a positive effect on internal concentration polarization as well. Sufficient turbulence is generated on both sides of tubular or hollow fiber membrane 2403 (external and internal) for securing continuation of increased flux performance required by the forward osmosis process. The process thus yields a higher permeate production with less concentrate for disposal and requires less up front pre-treatment for the feed, while using less energy compared to conventional reverse osmosis/nanofiltration technology because little or no hydraulic pressure is needed as a driving force for separation.

For a continuously operated forward osmosis process, it is necessary that the membrane module design allows liquids to flow freely on both sides of membrane elements. Cellulose triacetate is the preferred material used in membrane 2403 (TOYOBO Hollosep hollow fiber membranes, for example). Low pressurized, recirculating feed water flows inside of the hollow fiber tubes of the membrane module 2403 from low pressure feed recirculation pump 2405. The gravity-assisted feed flow is induced at the top of the axial vibrating, hollow fiber module 2403.

Figure 3:
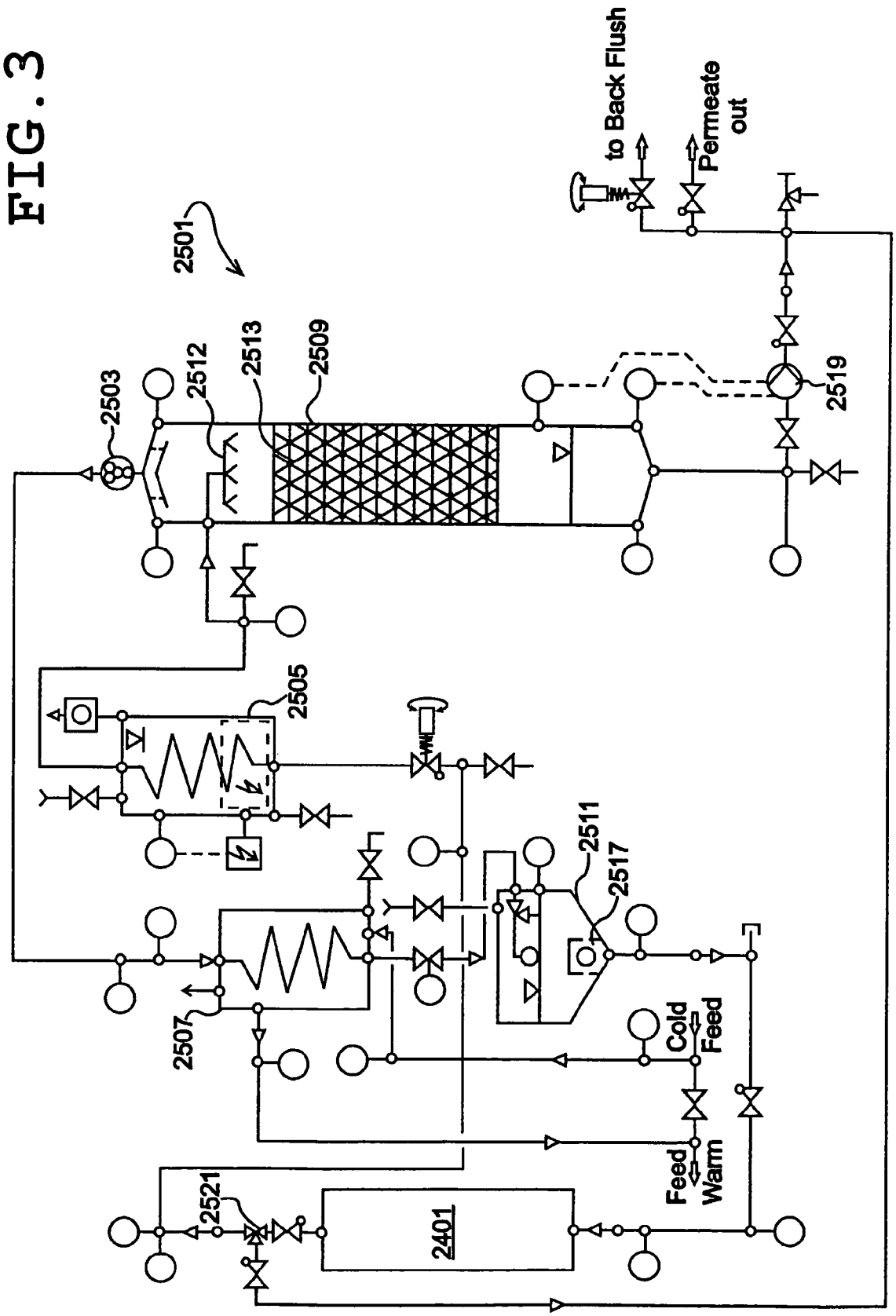
FIG. 3 is a diagram illustrating a second membrane technology of this invention utilizable in steps directed to the primary treatment of effluents.

Quaking membrane module 2403 can either be operated in a vertical or inclined position, quaking membrane movement is provided by means of quake generator such as high pressure diaphragm pump 2407. The low pressurized, draw solution flows counter currently to the feed on the outside of the hollow fiber tubes. The draw enters at the bottom of membrane module 2403 and exits at the top. Forced draw circulation flow is provided by vacuum and compressor pump 2503 (FIG. 3). The concentration of the draw solution is diluted as the high osmotic pressure of the solution draws water through the semi-permeable membrane from the feed medium of lesser osmotic pressure. This, in turn, requires a reconcentration of the draw solution for the continuous desalination process.

The diluted draw solution is thermally recycled and reconcentrated in a closed loop system, which yields potable water. The closed loop system consists of two heat exchangers 2505 and 2507, a stripper column 2509, and buffer tank 2511. In the closed loop, the draw solution diluted with water is first lightly heated to 30° to 50° C. in heat exchanger 2505. The heated draw exits heat exchanger 2505 from the top and is siphoned into stripper column 2509. Stripper column 2509 packing includes either raschig rings or berl saddles. Stripping takes place the column, the packing providing the necessary increased area and turbulence to achieve a desired draw solution conversion from a liquid to a vapor phase with the nonvolatile water precipitating out of the draw solution.

The lightly heated, liquefied and diluted influent (consisting of water and its soluble light volatile draw components) is distributed (at spray head 2512, for example) at the top of packed column bed 2513, flowing down through the bed where the large transfer area and the vacuum assistance of pump 2503 allows the volatile components of the diluted draw to convert into an effluent vapor phase in the upper column portion and yielding potable water dilution water from the lower column portion (the treatment product of this apparatus). Vacuum and compressor pump 2503 is configured to handle a large vapor volume on its suction side and compressing the vapor on its pressure side, and transfers the pressurized vapor from stripper column 2509 into the top of second heat exchanger 2507 for compression heat removal from the compressed vapor mixture. Cooling is provided by means of fresh cold feed water.

Figure 2:
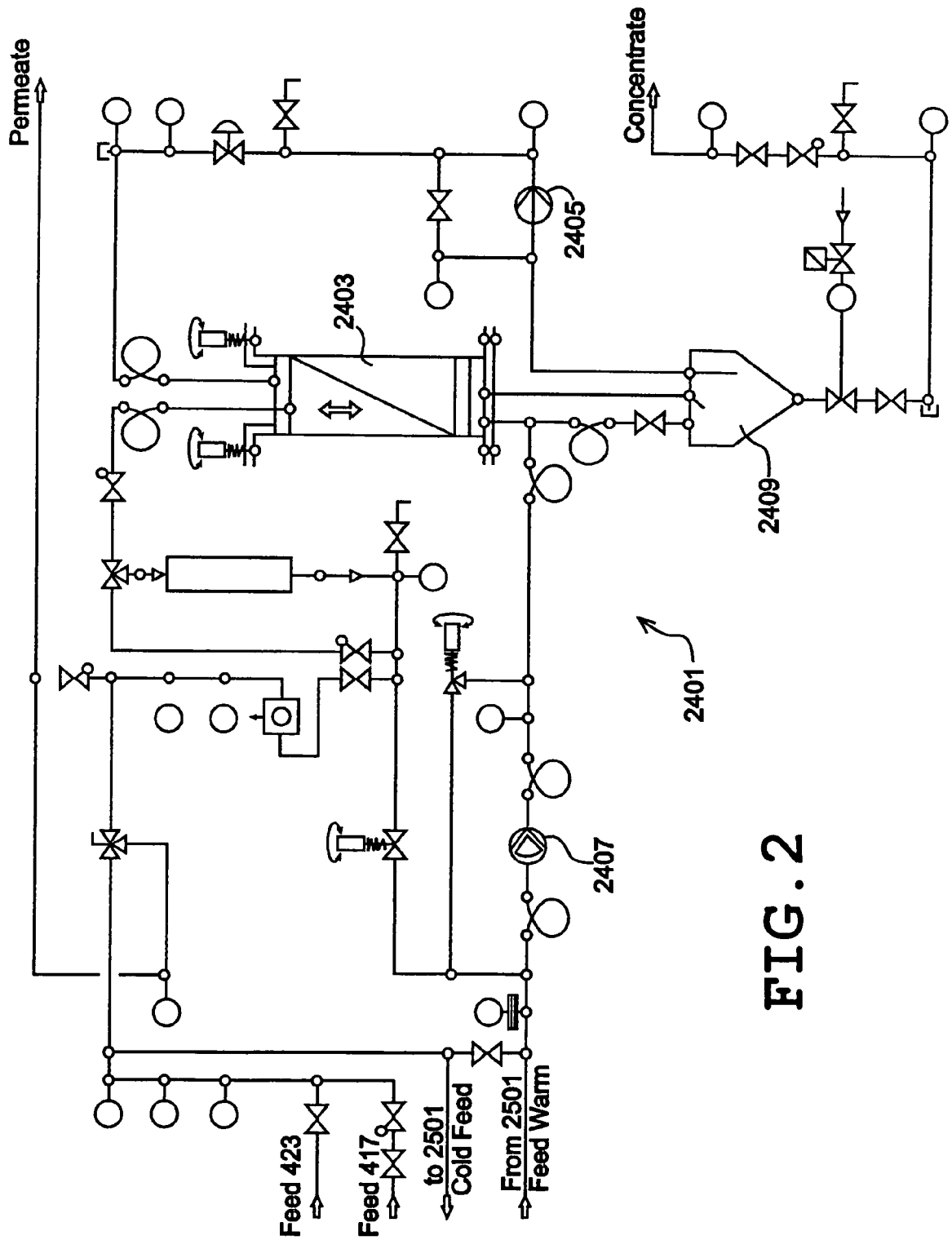
FIG. 2 is a diagram illustrating a first membrane technology of this invention utilizable in steps directed to the primary (effluent polishing) treatment of effluents.

The cooling the vapor phase yields a condensate of a highly concentrated solute mixture and thus generates a recycled draw solution of initial concentration strength. The vapor mixture condensate is discharged from exchanger 2507 into buffer tank 2511. Tank 2511 includes automatic aeration and de-aeration device 2517 to avoid the passage of residual vapor into hollow fiber module 2403. Treated water is transferred out of column 2509 by centrifugal-vacuum pump 2519 while retentate particle separation is achieved via hydrocyclone separator 2409 (FIG. 2). The upper module suction provides motive force to the recycled draw solution for flowing continuously from the lower permeate suction connection of module 2403 upwards and towards the upper permeate discharge connection, while the feed flows counter current to the draw downwards inside of hollow fiber module 2403.

The apparatus of FIGS. 2 and 3 is adapted for use not only with commercially available semi-permeable tubular and/or hollow fiber membranes modules, but also for forward osmosis specialized spiral-wound membranes when and if they become commercially available. The apparatus and processes can be used in applications for any brackish water treatment, higher contaminated CBM water treatment, overflow treatment of biological, defecated, municipal waste water for irrigation, cleaning processes for airplane and other public transportation wash water recycling, processing of bilge water, processing of wash water for combat vehicles after active and practice missions, and waste water processing for the pharmaceutical and chemical industry.

The quaking membrane coupled with the forward osmosis process allows a substantial concentration upgrading at stage 419 at a significantly reduced energy requirement compared to conventional membrane separation processes, and could be employed as well at stages 423, 429 and/or 433. Depending on the application, quaking membrane technology provides high recovery relative to conventional nanofiltration and/or reverse osmosis technology. Reduced scaling and fouling tendencies of the apparatus and processes reduce costs associated with pre-treatment stages used in conventional nanofiltration and reverse osmosis technology.

Quaking frequency is variable in the range of 1 to 100 Hz depending on configuration. Quake amplitude has a relatively wide adjustable range of 0.2 to 2.0 mm. Quaking membrane movement can be generated either by any of electrical, hydraulic or mechanical means through an adjustable high frequency generator. Electrical means can include electromagnetic linear reciprocating membrane motion apparatus through a frequency-controlled, modified linear motion motor assembly wherein frequency and amplitude can be adjusted dynamically over a greater range (from 1 to 100 Hz.—see FIGS. 4 and 5).

Figures 4A, 4B:
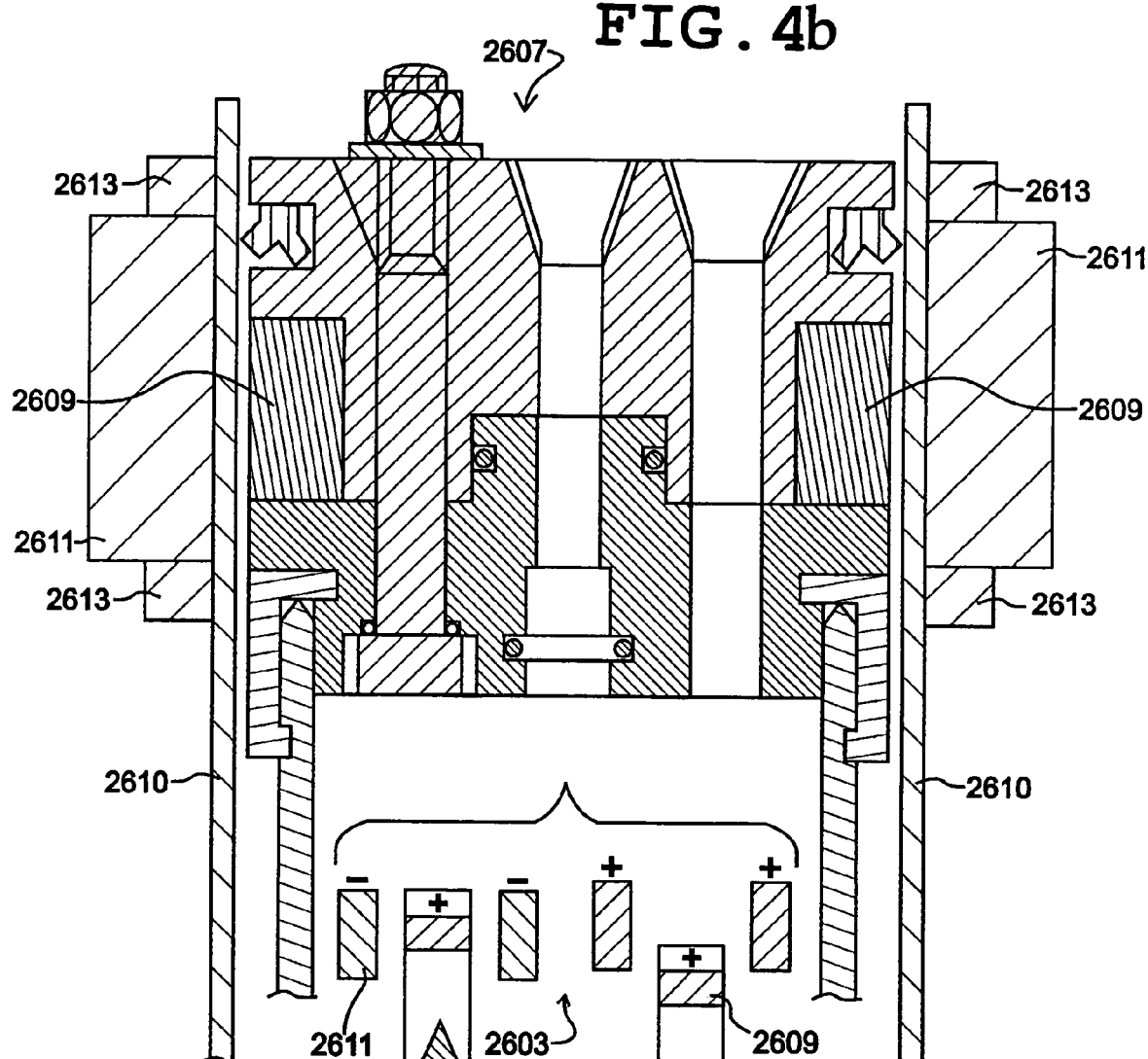
FIGS. 4a and 4b are illustrations of coil structures utilizable in the technology of FIGS. 2 and 3.

Modified motor assembly 2601 is shown in FIGS. 4a and 4b having an upper stator coil section 2603 and lower stator coil section 2605, upper and lower (upper components only being shown in FIG. 4b) fluid transferring end pieces 2407 being equipped with encapsulated, high-energy neodymium, iron-boron, reciprocating permanent magnet sleeves 2409. The nonmagnetic outer housing 2410 having with upper and a lower stator 2411 and retainers 2413. The stators contain the electromagnetic coils, which utilizes 3-phase direct drive, brushless technology. The stator's length and diameter set the force level, while the sleeve length determines the amplitude height.

Motor 2601 uses a dual synchronous design wherein two stators and two permanent magnet sleeves are spaced over the entire length of the membrane. These dual linear motors are operated synchronously thus providing positive linear reciprocating motion over the entire length of the membrane. Quaking membrane cartridge at 2403 floats and is supported between an upper recoil spring system and the lower support structure spring system (both at 2403), thus isolating membrane cartridge movement therebetween. Spring rate is adjustable for equalization of the stator coil force requirement between upper and lower stator coils 2411, with force requirements based on the chosen operational quaking frequency and amplitude.

As can be appreciated, the membrane cartridge rides up and down between two resilient spring isolation systems within a stationary (housing also at 2403), whereas the motive reciprocating forces are provided by means of dual synchronously operating linear motor assembly 2601. The two spring systems are configured to be adjustable for vibration transmissibility and damping efficiency (the spring system's ability to dissipate oscillatory energy and thus not transfer the energy to the entire quaking membrane module 2403).

Figure 5:
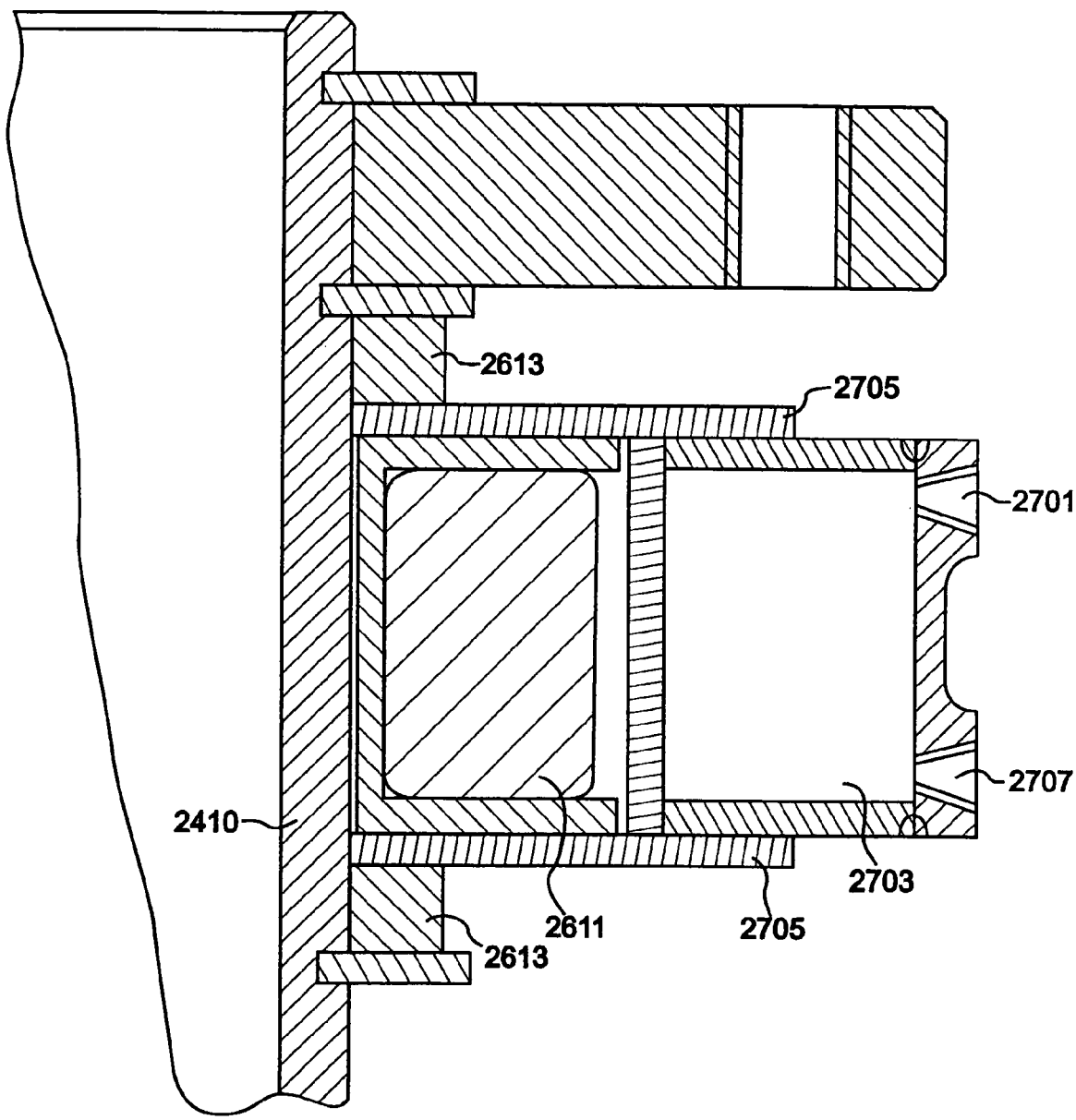
FIG. 5 is a detailed view illustrating coil cooling utilizable in the technology of FIGS. 2 through 4.

The modified linear motor assembly 2601 is essentially an electric motor that has its stator configured and positioned so that, instead of producing rotation, it produces a linear force along its length. As shown in FIG. 5 stator coil cooling can be accomplished utilizing a cold feed water stream (for example, from the same cold feed stream feeding heat exchanger 2507) fed by appropriate piping to port 2701 of ring-shaped cooler 2703 mounted between retainer disks 2705 adjacent to stator coil 2411. Feed at port 2701 is constantly replenished and recycled out at port 2707 connected at heat exchanger 2505.

Feedback in the forward osmosis system can be bypassed, if operations in quaking membrane mode only is preferred, by simple valving preventing re-osmosis of clean permeate. Three-way ball valve 2521 functions as a selector valve for quaking membrane plus forward osmosis mode operations or quaking membrane mode operations only.

Figure 6:
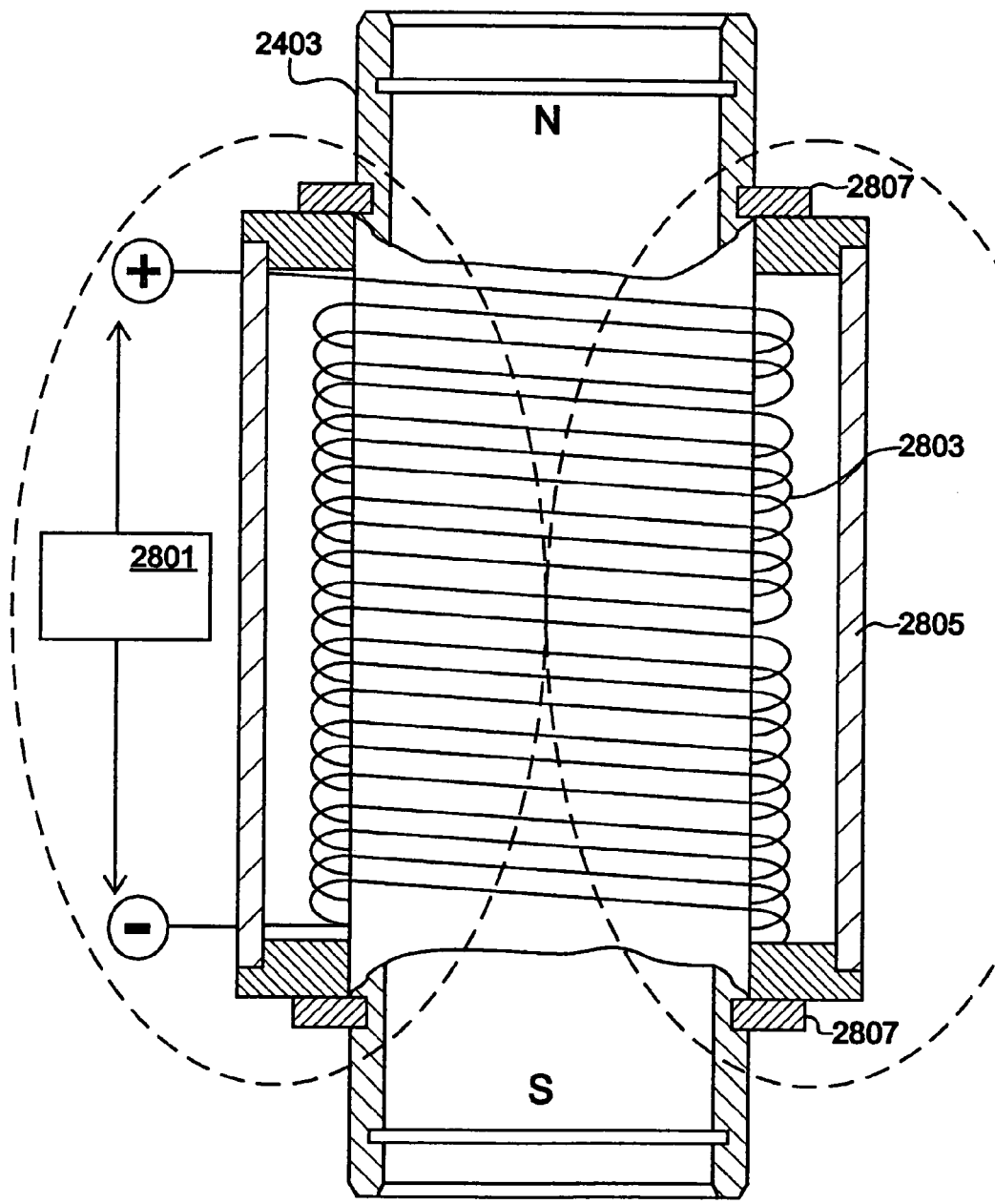
FIG. 6 is a diagram illustrating apparatus for internal concentration polarization control in the technology of FIGS. 2 through 4.

Osmotic pressure differential in the foregoing quaking membrane forward osmosis apparatus and methods is preferable provided by a magnetically recyclable solute composed of magnetic mixture of soluble salts. The use of magnetoferritin is known but requires removal from the aqueous stream by means of electromagnetic separation. To minimize problems associated therewith and with the problem of concentration polarization, FIG. 6 shows an ultrasonically active draw solution dispersion system in accord with yet another aspect of this invention.

Alternating electrical energy from ultrasonic generator 2801 is converted to an alternating magnetic field at coil 2803 in protective housing 2805 held around the outer housing of membrane module 2403 by retaining disks 2807. Coil 2803 extends substantially the entire length of module 2403. Generator 2801 is adjustable. The oscillating magnetic field induces hydrodynamic dispersion forces (turbulence) at ultrasonic frequencies in the ultrasonically active draw solution including magnetoferritin. The turbulence is at the internal boundary layer of the membrane thus minimizing internal concentration polarization. External concentration polarization is controlled by using a low pressure magnetically coupled centrifugal feed pump with an elevated output rate for producing external feed flow turbulence.

Figure 7:
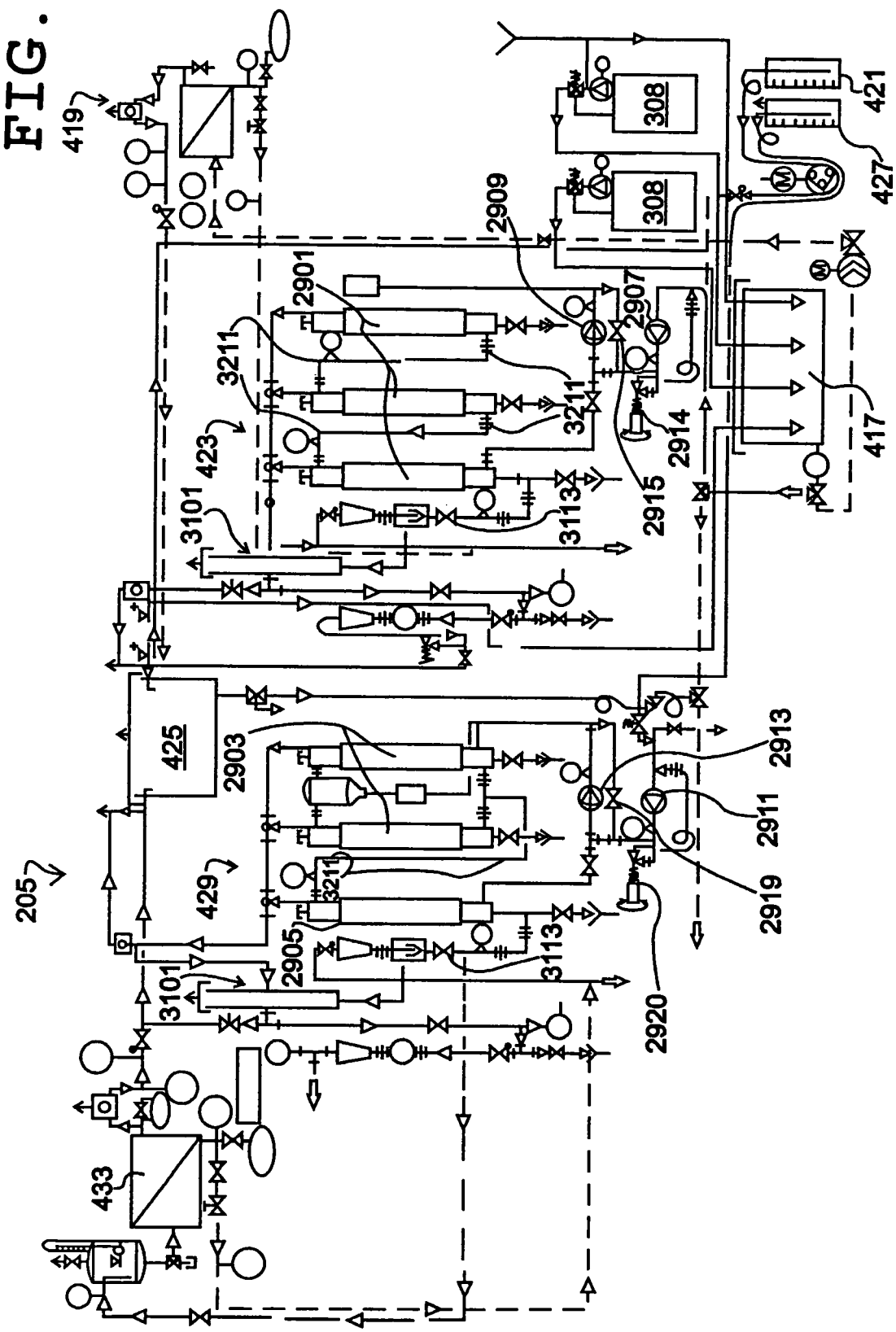
FIG. 7 is a diagram illustrating one membrane deployment option utilizable in primary treatment steps of this invention.

FIG. 7 shows one arrangement of components in a polishing treatment array 205 using membrane treatment systems especially concentrating on the integration of the membrane treatment systems of stages 423 (step 11 using the nanofiltration membrane treatment option) and 429 (step 14 using the reverse osmosis membrane treatment option). These two stages (implementing membrane processes) separate dissolved solids from the pre-treated water. The selection of specific membranes and spacer material are based on test results (for example, from on-site three-dimensional test cells such as those shown in U.S. Pat. No. 6,059,970). The systems are set to operate at moderately to high pressures and typically employ high speed gravity assisted geometries with selected variable crossflow capabilities.

Nanofiltration membrane implementation of stage 423 is a multistage configuration, operating in series. The array includes, for example, three pressure vessels 2901 each having a single membrane. The primary function of nanofiltration membrane treatment is the removal of the finest colloidal matter. The separated colloidal matter is removed with the nanofiltration concentrate. The produced nanofiltration permeate serves as feed the next membrane and, ultimately, for reverse osmosis implementation of stage 429.

The reverse osmosis implemented array of stage 429 includes, for example, two stages, with two membranes 2903 operating in parallel in the first stage feeding a third membrane 2905 in the second stage. As shown, each stage thus implemented has its own pressure pump and crossflow pump 2907, 2909 and 2911 and 2913, respectively. Nanofiltration stage 423 has a maximum operating pressure of 35 bar (508 psi), and a crossflow pump maximum rating of 50 gpm at a maximum of 60 psi in a 750 psi environment. Reverse osmosis stage 429 has a maximum operating pressure of 70 bar (1015 psi), and a crossflow pump rating of maximum rating of 10 gpm at a maximum of 45 psi in a 1,200 psi environment. System operating pressure is regulated through bypass regulators 2914 and 2920.

At this time, the most economical ready-made nanofiltration membrane shape is a flat membrane sheet in a spiral wound membrane element. A spiral wound element consists of multiple membrane pockets (for example 4-16 pockets), the spiral wound pockets terminating into a centralized collecting pipe. Special parallel polypropylene spacers of 80 mil thickness are preferred and complete the membrane (spiral wound nanofiltration membrane elements from Nadir with a practical neutral surface voltage (zeta potential), for example).

The nanofiltration special spacing materials (spacers) are especially effective in applications with high suspended solids (colloidal) concentration. Since the primary purpose of the nanofiltration is to remove all suspended solids rather than dissolved solids (such as salts), these types of spacers with their larger spacing between the membrane surfaces are preferred. A smaller membrane spacer for other applications could be use (for example, having 33 mil diamond spacer).

Alternatively, to maintain maximum processing flexibility at stage 423, low and ultra-low pressure reverse osmosis membranes could be used (where total dissolved salts are an issue). If nanofiltration membranes are employed, crossflow pump 2909 output flow must be turned down at bypass valve 2915 for a lesser brine to permeate ratio to achieve a more desirable permeate quality.

Reverse osmosis and/or HEED assembly buffer tank and at stages 425 and 431 can be any suitable tank and containment basin (for example, a three leg tank by SNYDER). Stage 427 (step 13) is interposed to reduce scalants in reverse osmosis processes. Bicarbonate ($HCO_3$) is present in many post production waters presented for treatment (such as CBM water, for example). Many produced CBM waters are near saturation in dissolved bicarbonate. When these waters are concentrated in a reverse osmosis system, calcium carbonate will be one of the first salts to precipitate. Calcium Carbonate scaling potential can be estimated using stability index calculations.

Prevention of calcium carbonate precipitation in nanofiltration or reverse osmosis systems is aided by injection of sulfuric acid at pump 306 into a homogenizing buffer tank at stage 417 to condition nanofiltration and/or reverse osmosis feed water. This will convert much of the bicarbonate to carbonic acid and dissolved carbon dioxide as well as increase the solubility of calcium carbonate due to the lower pH. In estimating the acid concentrations for pH adjustment, the rule of thumb is that lowering the feedwater pH to between 6.0 and 6.5 will reduce the bicarbonate concentration by about 80%. For most CBM waters and typical pilot program nanofiltration and/or reverse osmosis permeate recoveries, an 80% reduction of bicarbonate will be sufficient to prevent calcium precipitation.

By inline injection of a fouling and scaling inhibitor (such as VITECH 3000) at stage 421 into the nanofiltration feed stream, colloidal and scale crystal growth is slowed, colloidal formation inhibited, and the crystalline shape of the scale crystal is modified. By inline injection of a scaling inhibitor (such as VITECH 4000) at stage 427 into the reverse osmosis feed stream, scale crystal growth is slowed and crystalline shape is modified. It should be realized that scaling by other salt types can occur simultaneously (for instance, $BaSO_4$). Therefore, it is necessary for the hybrid dosing to catch the remaining scaling causing salts with an antiscaling medium. Common scale inhibitors consist of molecules that contain carboxylic or phosphate functional groups. Lower molecular weight polyacrylate molecules contain multiple carboxylic functional groups.

At reverse osmosis implementation of stage 429, membranes 2903 and 2905 are preferably spiral wound polyamide skin layer composite membranes with a zeta potential of approximately −7 mV and a polysulfone support layer and standard 31 mil diamond spacers (since prefiltered feed water will be used). Optionally, seawater polyamide membranes with a spacer thickness of 27 mil could be utilized. The polyamide thin layer membranes are constructed with an aromatic polyamide extruded onto a less dense polysulfone substrate. The optional seawater membrane elements use a denser polyamide membrane layer with better rejection characteristics.

Polyamide membranes are sensitive to oxidizing agents such as free chlorine or iodine. This requires that chlorine or iodine present in the feedwater be removed by a reducing agent (such as sodium bisulfite in the case of chlorine injected upstream of the reverse osmosis modules). To avoid fouling in such case, a non-oxidizing biocide like BUSAN (150 to 1500 ppm) can be continuously injected in-line with the reverse osmosis feed stream. This mixture which kills bacteria, fungi and algae is compatible with the membrane material as well as the other injection chemicals used.

A number of parameters can affect reverse osmosis permeate flowrate at stage 429 (or stage 425 if used there also). These include water temperature, salt concentration and membrane pressure as the feed water flows through the system. Stage 429 is preferably configured to work within a minimum and maximum range of 1,000 ppm to 20,000 ppm TDS, as well as a temperature range of 40° to 80° F. The system's maximum design pressure is around 1,000 psig.

Higher pressures result in higher permeate flowrates and better salt rejection characteristics. Higher pressures also require more power and can result in higher membrane fouling rates and reduced membrane life expectancy. These considerations are important considerations for programming at steps related to upsizing (to full size plant). In addition, higher pressure operation may require stainless steel, fiberglass/epoxy or carbon fiber/epoxy membrane housings and piping material to handle the higher pressure. To maximize flexibility, reverse osmosis systems configured for high pressure operating capabilities are often preferred.

Membrane 2903 housings are arranged vertically rather than horizontally, and all are top fed. This operating geometry provides gravitational assistance to the high speed crossflow turbulence. Crossflow (recirculation flow) is provided by pump 2913 and flow controlled by bypass valve 2919. System pressure is controlled by pressure regulator 2920. Pressure pump 2911 operates at a maximum flowrate of 2.65 GPM at a maximum 1,029 psi.

In facilities that employ high speed gravity assisted geometries in their system design, membrane systems are working with an unconventional high crossflow velocity, and the membrane housings are geometrically arranged in a vertical top feed position. Therefore, it allows the feed water crossing the membrane with the assist of gravity, whereby the chosen array minimizes the pressure differential across the membrane system. This differential would otherwise take away from the net driving pressure at the tail end of the individual membrane system.

A portion of the concentrate is recycled back to the overall membrane system feed to increase recovery beyond the 75% it may have already achieved. For example, by recycling only ⅕ of the concentrate back to the feed, recovery can be increased to an 80% permeate recovery. This results into a 20% reduction of disposable concentrate production. The concentrate recirculation (retentate) flow rate for the pilot unit operation is provided through the crossflow pumps 2909 for the nanofiltration at stage 423 and 2913 for the reverse osmosis at stage 429.

In order to provide the desired high crossflow velocity over the membranes, and in accord with another aspect of this invention, separate high flow, low pressure crossflow pumps are utilized. Since pressure pumps 2907 and 2911 of the membrane system cannot fulfill these requirements, separate low pressure but high flow crossflow pumps operating in a high pressure environment with flowrate adjustment capability are needed. These pumps are magnetically driven with no seals and are equipped with high pressure stainless steel housings to contain a feed pressure of up to 1200 psi. The relatively small, low energy, high pressure feed pumps provide the system operating pressure. The feed pressure and flow rate is preferably regulated by a vector drive.

Through this arrangement, the feed achieves sufficient pressure through the high pressure feed pumps for membrane separation. These high flow crossflow pumps provide sufficient turbulence and hydrodynamic shear to flush down and clean out the membrane flow channels of contaminated matter to minimize any fouling/scaling potential of the specific membrane system. The low operating pressure of the crossflow pump does not create excessive pressure even when operated at full flow capacity. Crossflow meters are preferably utilized to measure, control, and obtain optimum crossflow and crossflow velocity to achieve sufficient turbulence to minimize fouling/scaling potential. Turbine meters with magnetic pickups and transmitter/read-out units are preferred. The preferred pumps here are magnetically driven centrifugal pumps. The high flowrate is needed to cover a large crossflow rate range. The flowrate is easily adjustable through a valve controlled by-pass.

Figure 8:
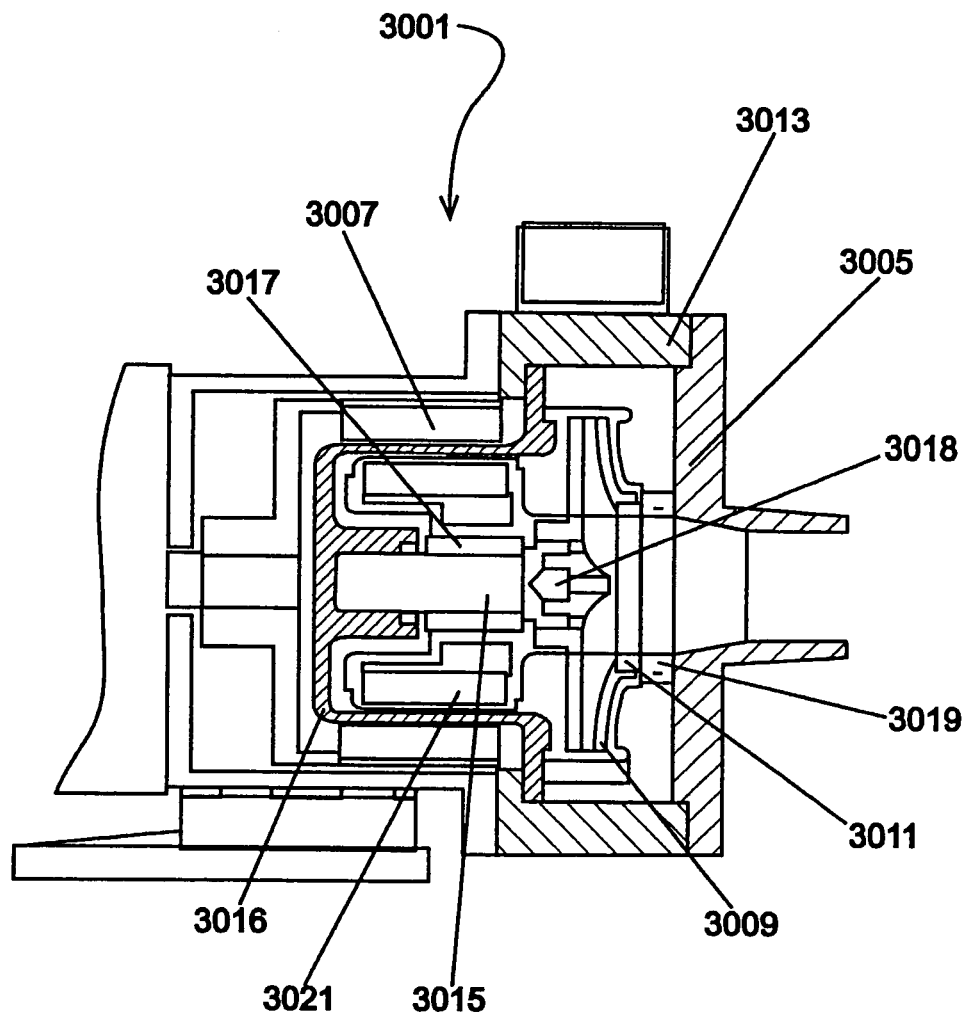
FIG. 8 is a sectional illustration of a crossflow pump of this invention utilized in various membrane separation technologies.

Turning to FIG. 8, the preferred magnetically driven centrifugal pump 3001 (used, for example, for pumps 2909 and/or 2913) of this aspect of the invention is illustrated, such pumps being heretofore commercially unavailable that can operate in a high pressure environment (over 500 psi for the nanofiltration, and in excess of 1,000 psi for reverse osmosis). All high pressure parts are manufactured from compatible nonmagnetic stainless steel series 316 or 312, 316L or Hastelloy C4 (casing sections 3005, 3013 and 3016, for example). Nonmagnetic stainless steel is required to contain the high operating system pressure, to offer corrosion resistance in a chloride rich environment and to allow a magnetic field transfer, from drive magnet 3007 to magnet capsule 3021, to facilitate the no touch magnetic coupling process.

Another novel element of the pump design herein is use of off-the-shelf plastic low pressure internal pump parts (for example, impeller 3009, mouth ring 3011, spindle 3015, rear thrust 3018, front thrust 3019 and magnet capsule 3021). Since pump shavings from plastic impellers have been known to foul the lead end elements of membrane systems, an optional discharge screen downstream of the pump is recommended. A chemically resistant coating such as Ceramic, PVDF, PP, PE, HPE, PTFE or PFA is utilized to prevent pitting and is applied to the inside of high pressure pump components.

The magnetic pump is otherwise of convention design. Ceramic spindle 3015 is mounted rigidly on one end onto stationary, high pressure resisting rear casing 3016 which is made from non-magnetic stainless alloy. Main bearing 3017 rotates on the protruding end of spindle 3015, bearing 3017 press fitted into magnet capsule 3021 which is counter-rotationally twist-locked onto impeller 3009. Pointed conical rear thrust 3018 is mounted on impeller 3009 and limits rearward movement of magnet capsule 3021 and impeller 3009. Thrust 3018 rides against the front face of stationary spindle 3015 thus limiting the rear thrust. Likewise, front thrust of magnet capsule 3021 and impeller 3009 is limited by impeller mounted mouth ring 3011 riding against the front face of stationary front thrust 3019. The feed medium itself provides lubrication between moving and stationary thrust contact areas.

Figure 9:
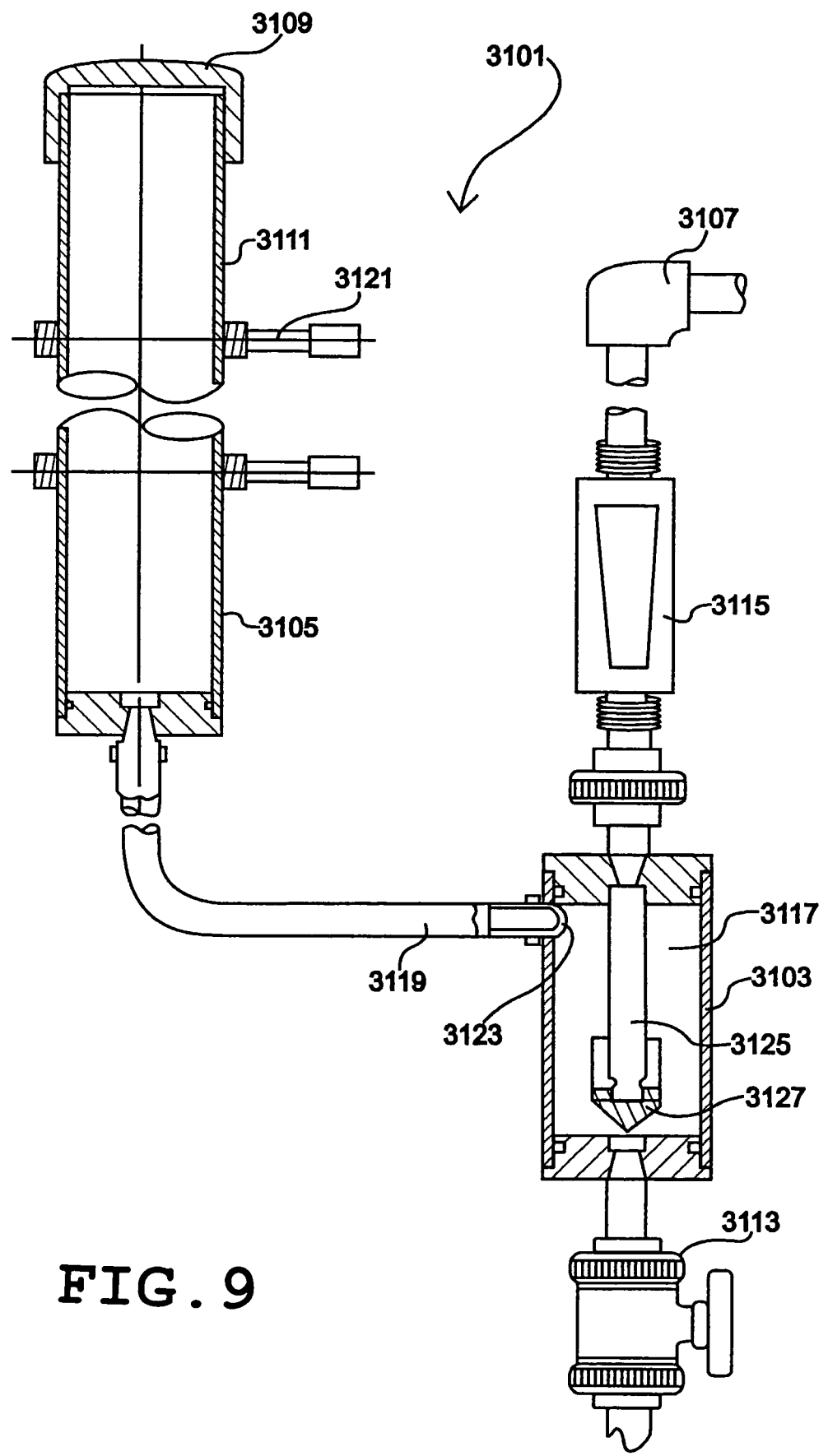
FIG. 9 is a sectional illustration of an improved degasser column used with the membrane systems of this invention.

In accordance with another aspect of this invention, in-line degasser and degasser column assemblies 3101 are shown in FIGS. 7 and 9. Assemblies 3101 are specifically adapted for air and/or $CO_2$ removal or reduction in the produced membrane permeate flow stages 423 and 429 in order to improve flow rates and flow data acquisition in the permeate production process. The design, use and application of these assemblies are an improvement over prior art designs and methods. Assemblies 3101 condition flow of produced permeate by air/gas removal prior to processing through flow instrumentation and recording devices for the generation of real time liquid flow data without error producing air or gas content. Assemblies 3101 are adaptable in any setting where enhanced flow process stabilization is required in a liquid system with entrained and unwanted air or gas and where in-line degassing is needed for flowmeter applications. No packing material is needed for optimum surface area contact between the water and the air as is used in conventional tall column forced-draft degassifier designs.

Assemblies 3101 include inline degasser 3103 and attached degasser column 3105, and has no moving parts. Head back pressure control can be adjustable by height adjustment of elbow 3107 relative to the top of column 3105 (at cap 3109). Visual inspection of ongoing degassification processes can be monitored through clear column tube 3111. Ball-valve 3113 controls flow to degasser 3103 of assembly 3101, flowmeter 3115 following degasser 3103. Gas supersaturated concentrate flows into the bottom of expansion chamber 3117 of degasser 3103 providing atmospheric pressure release through top connected hose 3119. Hose 3119 is connected at the other end to degasser column 3105.

Vertical adjustment of column 3105 provides proper backhead, back-pressure control, the column's horizontal swivel capability at cantilever arm 3121 providing dead leg free hose transfer. Head is adjusted to match individual concentrate draw-off by keeping enough column head on column 3105, which is open to the atmosphere. As a result, a spilling out of concentrate flow is avoided. Through controlled release of back-pressure, concentrate discharge gas pressure is lowered in expansion chamber 3117.

The in-rushing expanding $CO_2$ bubbles towards the lower pressure level of upper expansion chamber outlet 3123. The rising bubbles accelerate during their ascent due to the simultaneous decline of available head pressure in assembly 3101. Since the ascending bubbles are shielded from entering the lower water transfer openings in pipe riser 3125 by shield 3127, only the descending, saturated but bubble-free water enters the transfer openings. The now transformed water from the supersaturated to the saturated stage is calm enough to allow for meaningful flowmeter readings and control.

Figure 10:
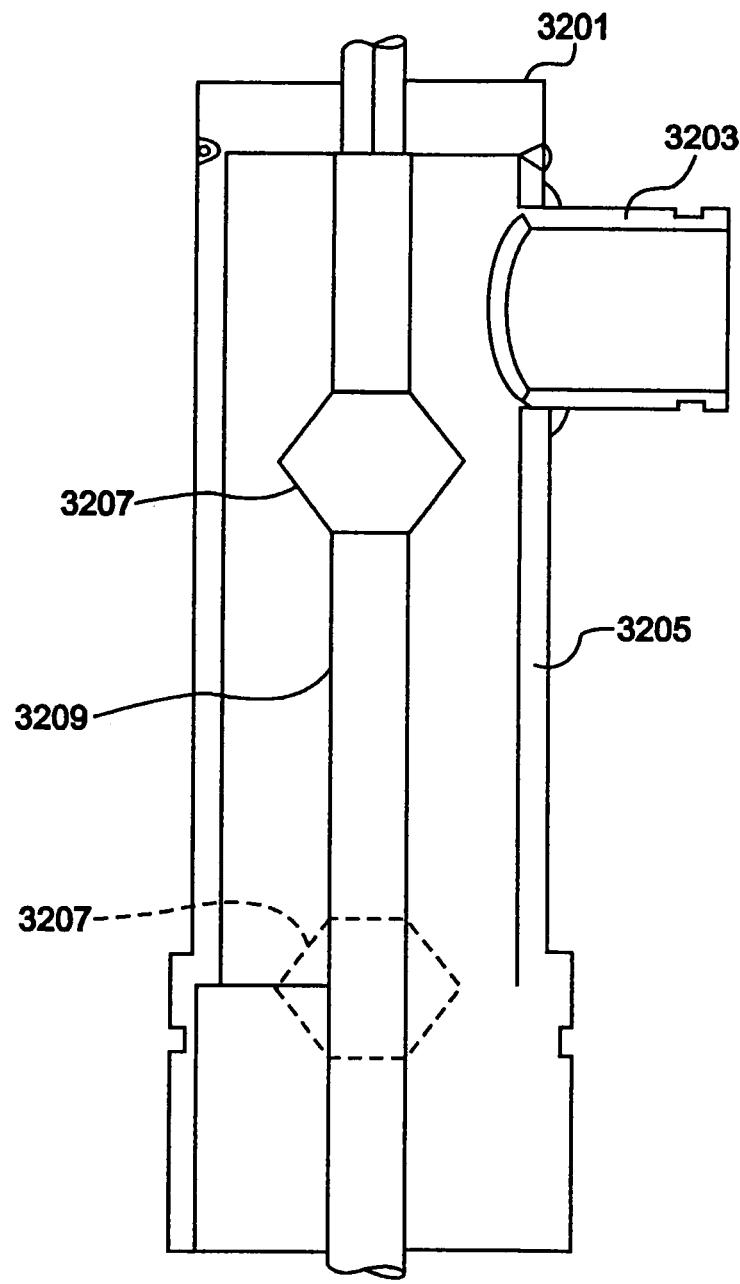
FIG. 10 is a flow distributor and discharge equalizer deployed, for example, with the membrane systems of this invention.

Flow distributor and discharge equalizer 3201 in accord with another aspect of this invention is shown in FIG. 10. The method of use of equalizer 3201 is novelly adapted to use with high speed crossflow membrane systems operating in a gravity assisted mode. Equalizer 3201 is hydrodynamically designed for flow direction from a horizontal entry flow at port 3203 to a vertical flow in housing 3205, and a flow directional change back from a vertical flow to a horizontal side exit flow to enhance operation of the vertically mounted high speed membrane systems.

Flow altering distribution cones 3207 at product tube extension 3209 provide favorable hydromechanical loading and unloading for spirally wound membranes by distributing the in-rushing high crossflow of high operating pressure more evenly into the leading portion of the vertically arranged membranes. Since favorable membrane hydromechanics extends useful membrane life expectancy, cost savings are realized.

Equalizers 3201 are mounted in place of long sweeping mounting elbows usually used for top entry and bottom exit of conventional high speed, vertical membrane system designs (at 3211, for example, in FIG. 7, other utilization nodes being identifiable in the drawings). This improved hydrodynamic design adapted for side entry operation is a practical method for reducing overall height and footprint requirements of a vertically mounted, high speed membrane system.

Figure 11A:
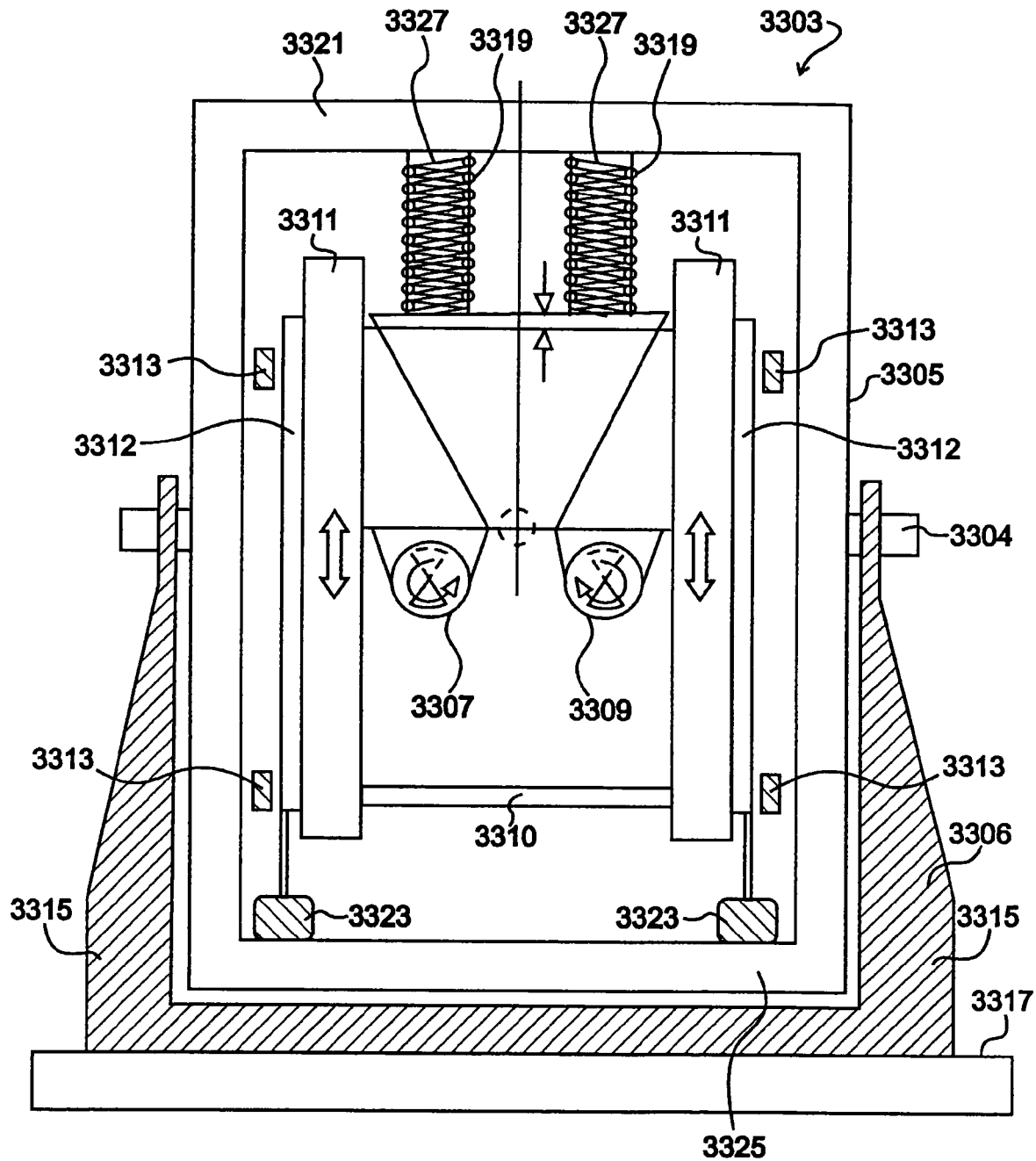
Figure 12:
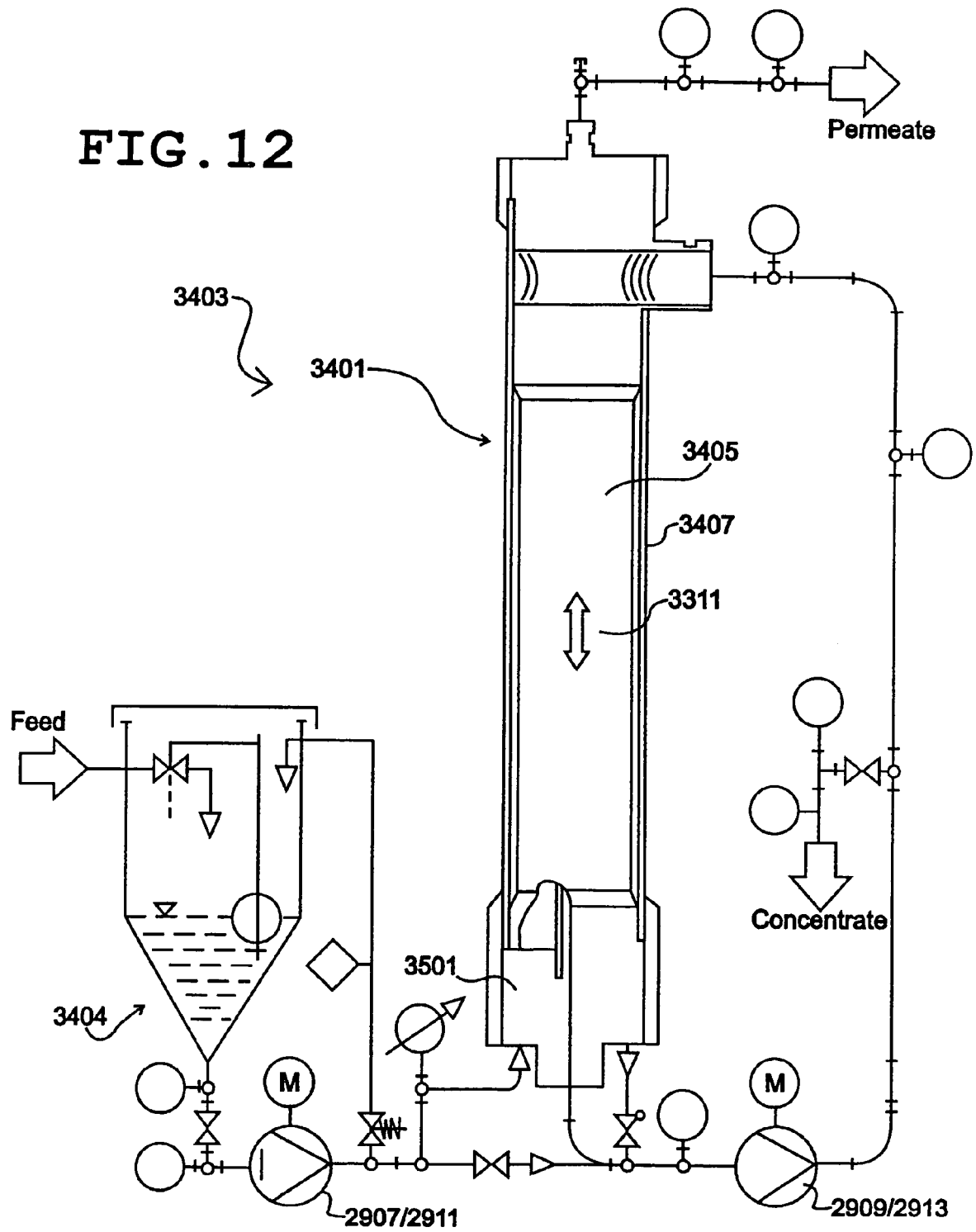
FIG. 12 is a sectional diagram illustrating a second embodiment of the high frequency oscillating membrane system.

In accordance with another aspect of this invention, a first embodiment of a high frequency membrane separation apparatus and method utilizable with membrane systems of this invention is shown in FIGS. 11a and 11b. This invention relates to apparatus and methods for fluid filtering utilizing membrane separation (for example nanofiltration and/or reverse osmosis filtration) that combines vibratory shear techniques with adjustable crossflow techniques. This and further embodiments of the high frequency membrane separation apparatus and methods (set forth hereinafter) are particularly well adapted to treatment stages 419, 423, 429 and/or 433 when membrane treatment options are applied (generically referred to hereinafter as membrane treatment systems).

High frequency membrane separation herein refers to vibrating, oscillatory motion of the membrane support structure. Vibration direction is perpendicular to the floor of the installation for gravity assisted membrane separation systems. The vibration curve is preferably a regular curve, which corresponds mathematically to a zero centered sine or cosine, a sinusoidal or simple harmonic. The amplitude is preferably steady and frequency high.

This hybrid does not depend solely on vibratory induced shearing forces to prevent fouling and thus does not require total shut down of the membrane separation process during preventive maintenance on the vibrators. The shear wave produced by axial vertical membrane vibration causes solids and foulants to be lifted off membrane surfaces and remixed with retentate flowing through the parallel or tunnel spacer or other specially designed spacers of spirally wound elements or through flow channels of tubular or capillar membrane elements. Movement continuity is maintained through the adjustable crossflow, reducing further additional membrane fouling tendency.

This hybrid approach using adjustable crossflow and high shear processing exposes membrane surfaces for maximum flux (volume of permeate per unit area and time) that is typically higher than the flux of conventional vibratory membrane technology alone. In the conventional vibratory membrane design, each membrane module requires its own vibratory energy source. Only a single vibratory engine 3303 is utilized for a multi-membrane module design herein (up to thirty-two 2.5", sixteen 4" or eight 8" membrane modules).

To suit certain operating environments, where height restrictions and/or leveling problems are encountered, high frequency membrane separation apparatus of this invention can be operated at an incline using center pivot 3304 for adjustment of swivel framework 3305 (from standard vertical position to a maximum 15° incline orientation) in swivel support 3306. Unlike other vibratory membrane separation technology which employs horizontal vibratory torsional motion in the axis plane of abscissa (x), and which require use of proprietary one source only custom membrane modules, this approach is more flexible. Readily available, and thus less costly, conventional membrane modules can be used, and mounting of membrane modules in a vertical flow gravity assisted position with adjustable crossflow operation is accommodated.

This embodiment of the high frequency membrane separation apparatus uses twin motors connected at shaft/eccentric and weight assemblies 3307 and 3309 of the motors in vibratory engine 3303 to provide shear enhanced fouling reducing membrane separation (these vibrator motors are well known structures). The motors are preferably 3-phase 1800-3600 RPM induction motors delivering high speed synchronized centrifugal force, one motor rotating shaft/eccentric and weight 3307 counter-clockwise and the other rotating shaft/eccentric and weight 3309 in a clockwise direction.

The vibrator motors are capable of producing net centrifugal forces that change direction in space as the motor rotates. Such a force acts upward at one instant and downward a half-rotation later, thus producing a force that acts sinusoidal at a frequency that corresponds to shaft/eccentric/weight assemblies' 3307/3309 rotation.

Adjustable eccentric weight provides variable force output (from 0% to 100%) at a synchronized mode of operation (i.e., the adjustable weights are aligned with each other at 90° for clockwise rotation and 270° for counter-clockwise rotation). A vibratory high-speed linear motion through center of gravity thus impacts swivel framework 3305 having the vibrating motors mounted on the inside thereof and the membrane modules mounted on the outside thereof.

Support box frame structure 3310 is preferably square tubing 2"×2" with a ⅛" wall. Frame structure 3310 carries membrane modules (hereinafter 3311, generally applied, for example, to modules 2901 or 2903/2905 of FIG. 7 or other membrane modules disclosed herein and related to the various nanofiltration and reverse osmosis options) and includes frame uprights 3312 mounted via rubber dampeners 3313 (preferably eight) at swivel framework 3305 (one upright per corner of the support structure). Swivel frame uprights 3315 of support 3306 are preferably made from fabricated ¼" steel material, and are connected to seismic absorbing mass at fabricated steel base frame 3317. Base frame 3317 is preferably at least partially filled with concrete to add mass.

Two springs 3319 are located in-line at the top of support structure box frame 3310 (supporting panel structure not shown) and between horizontal top frame members 3321 of the open swivel framework 3305. Dampeners 3323 are located adjacent to bottom frame member 3325 of swivel framework 3305. As compared to conventional springs, urethane springs/dampeners are preferred for their high load-carrying capability, longer life, abrasion resistance, low noise, and vibration damping and shock absorbency.

The springs themselves are cylindrical, and four connecting bolts 3327 fasten support structure 3310 to swivel framework 3305. The fine-threaded connecting bolts allow for vibratory amplitude adjustment in a range up to about 1". If combined with conventional coil springs, the vibratory amplitude adjustment range increases up to 1.5". Together with the adjustable frequency drive (or inverter drive), customization of axial vibratory linear motion for shear enhanced fouling reducing membrane separation is accommodated.

A second embodiment of the high frequency membrane separation apparatus and methods of this invention is shown in FIGS. 12 through 16. In the embodiment shown in FIG. 12, vibration is hydrodynamically controlled. This embodiment is specially applicable whenever a homogen disperse fluid substance with a lower concentration polarization layer has to be treated—for instance, organic and inorganic colloidal solution as well as fine disperse suspensions and higher concentrations of salt solutions (TDS 1,000-50,000 mg/L). Since high shear rates are not required in high frequency membrane separation apparatus 3401, apparatus 3401 can be configured to operated at a lower amplitude. System 3403 can operate efficiently at a lower amplitude.

Vibratory impulse energy is provided through the primary feed pump (for example, pumps 2907/2911 as shown in FIG. 7), no secondary vibratory energy source is required. Furthermore, only the membrane, fluid column (preferably pre-filtered as taught herein, generally represented at 3404) and some associated internal components of apparatus 3401 are vibrated (not the entire unit including support mass). One feed pump 2907/2911 can serve one or many modules in parallel feed array.

Figure 16:
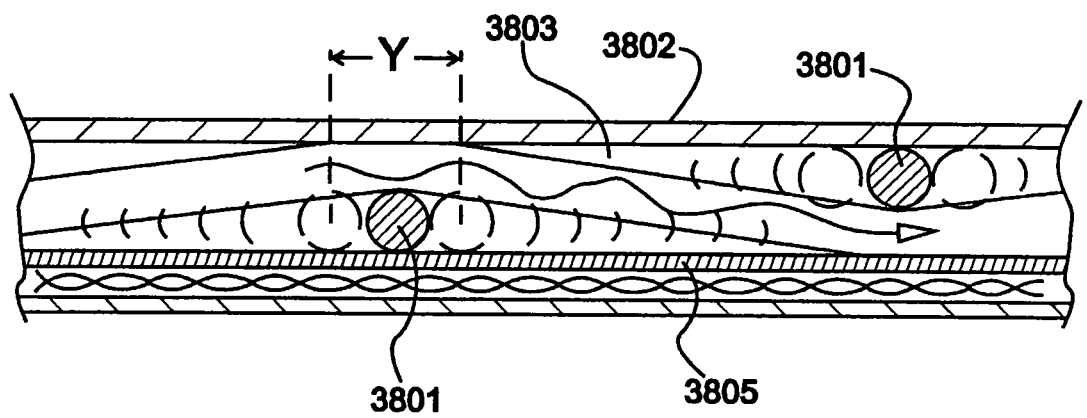
FIG. 16 is an illustration showing function of the spirally wound membrane elements of the oscillating membrane system of FIG. 13 (also employable in other oscillating systems shown herein)

In combination with heretofore described crossflow characteristics, hydrodynamic vibration herein provides axial vibration of amplitude "Y" to enhance the sinusoidal flow pattern between transverse spacer rods 3801 in membrane media 3802 (see FIG. 16). Vibration amplitude is controlled through stroke adjustment. The system operates with low vibratory energy waves which are scaled to provide effective agitation. Axial vibration with a maximum amplitude Y of only about 2 mm for a spirally wound membrane is sufficient to maintain proper permeate continuity. Apparatus 3401 provides sinusoidal meandering turbulent cleaning action by high frequency vibration up to 180 Hz in a tangential direction to the surface of the membranes (see FIG. 16).

Figure 13:
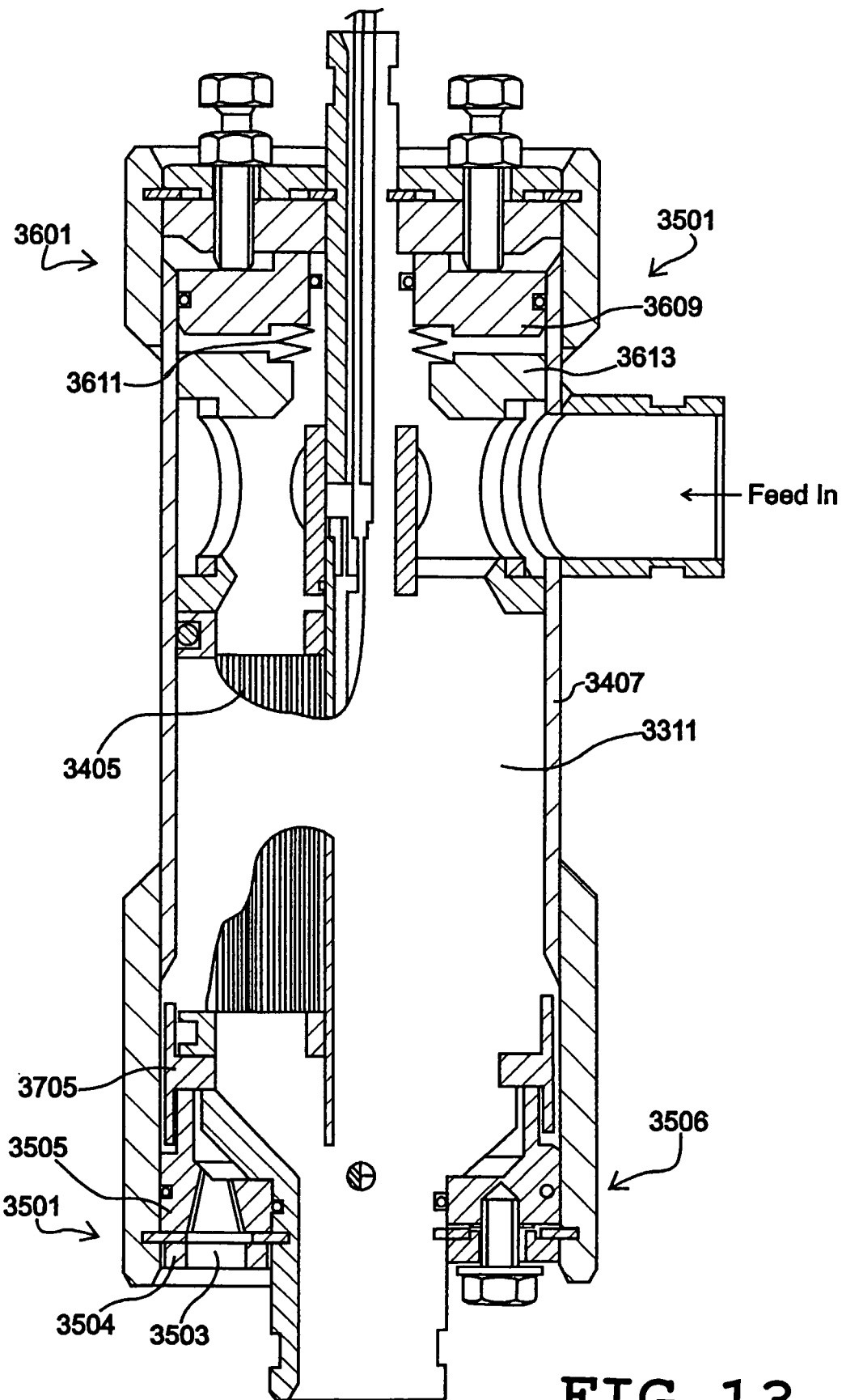
FIG. 13 is a partial sectional illustration of the oscillating membrane system of FIG. 12.
Figure 14:
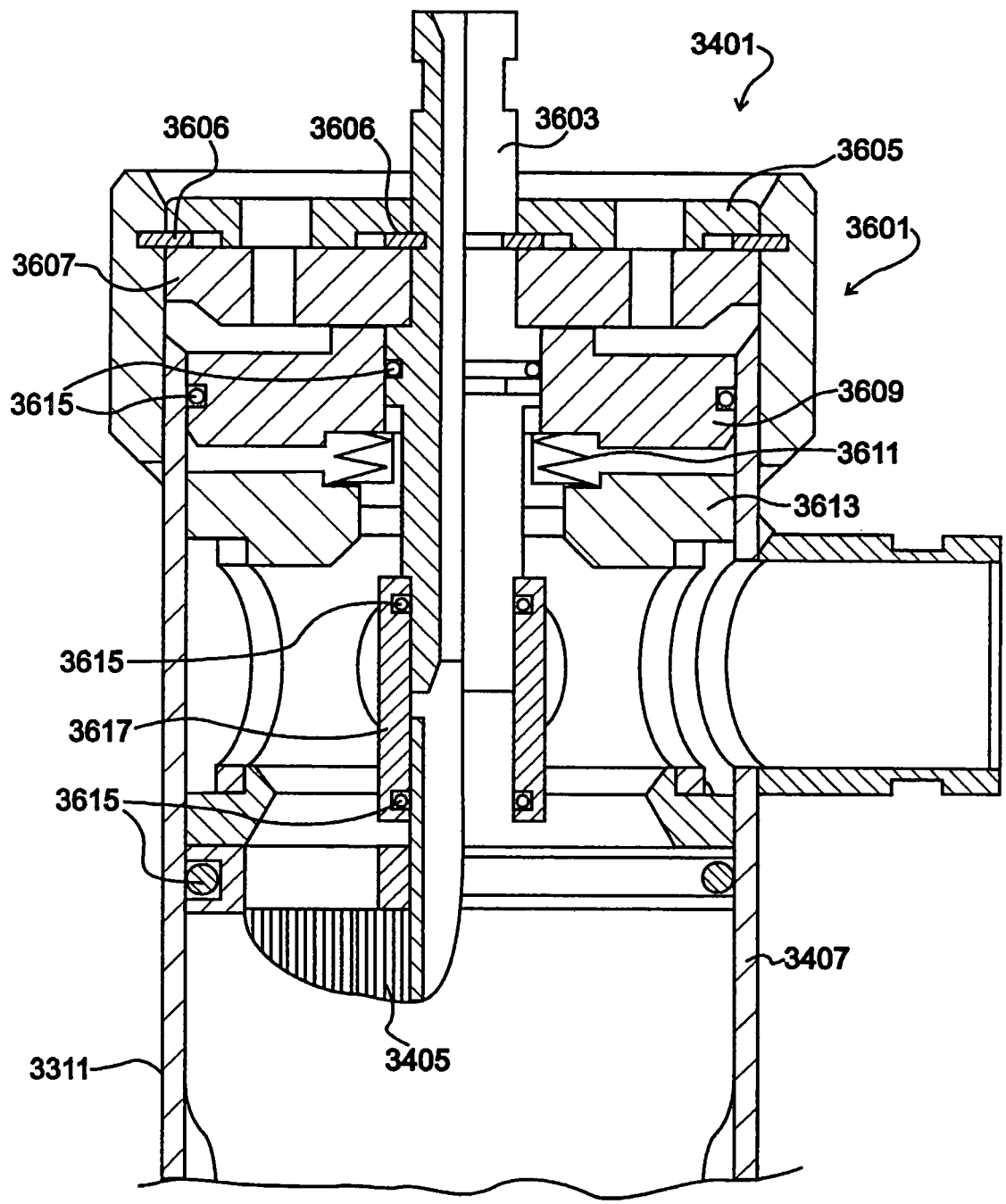
FIG. 14 is a detailed sectional illustration of the upper part of the oscillating membrane system of FIG. 13.
Figure 15:
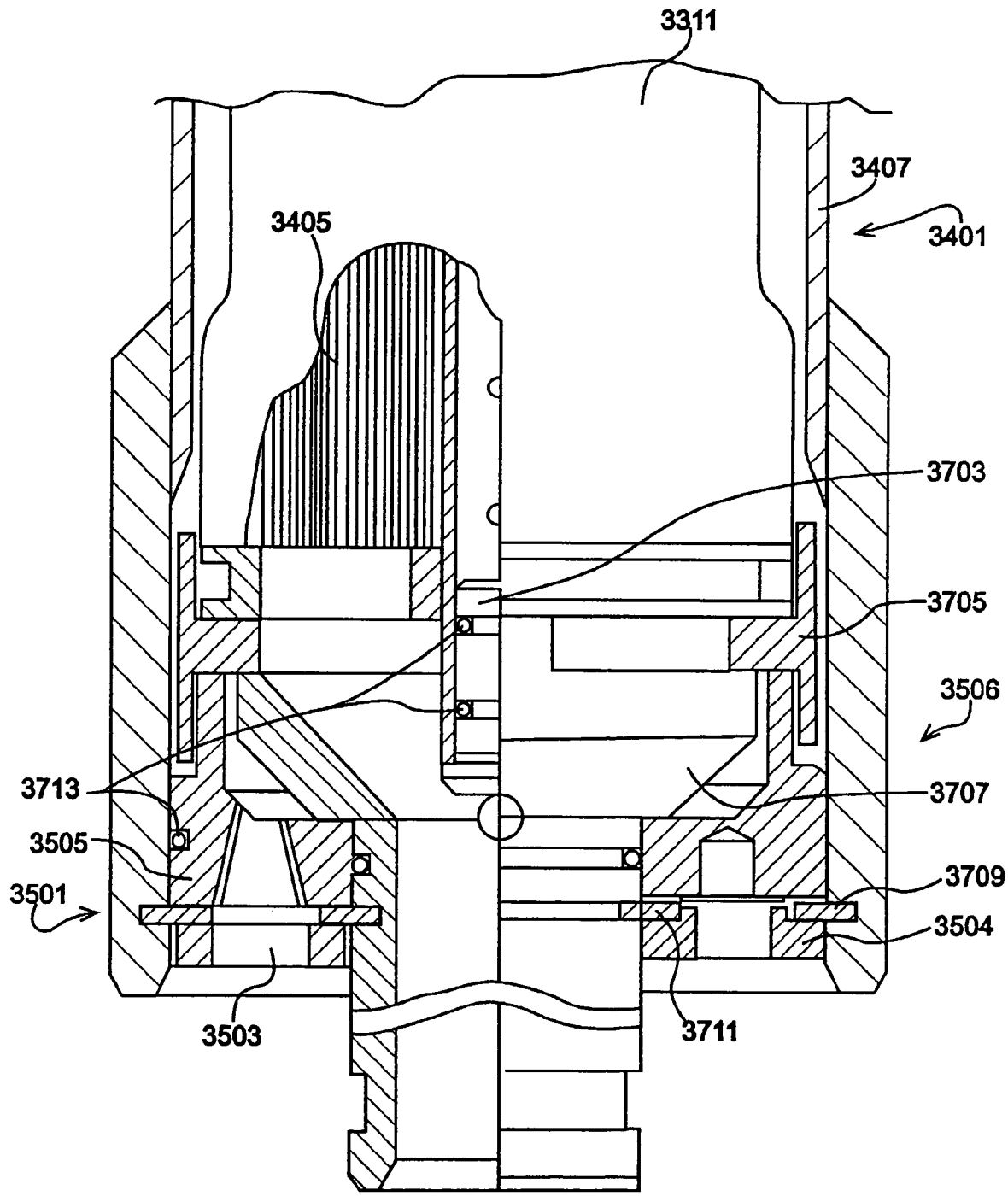
FIG. 15 is a detailed sectional illustration of the lower part of the oscillating membrane system of FIG. 13.

To affect the benefits of hybrid apparatus 3401 membrane element 3405 is oscillated within the membrane housing 3407 (see FIGS. 13 through 15). The bulk stream containing the returned suspended particles between the membrane leaves of spirally wound membrane elements (generally at 3803 in FIG. 16), and in the flow channels of tubular and/or capillary membrane elements, is continuously flushed out of the membrane module by means of the gravity assisted low crossflow. Since apparatus 3401 does not depend on crossflow induced turbulence, feed of a homogen fluid substance with a lower concentration polarization layer can be concentrated at a higher level.

Crossflow pressure can be maintained in a low range between 35 and 140 kPa (utilizing crossflow pump 2902/2913, for example) thus producing an adjustable low crossflow velocity in the range of 0.075 to 1 m/s and requiring low operating energy. Sufficiency of turbulence for anti-fouling/scaling is maintained by high frequency of the vibration. Produced are low vibratory energy waves scaled to provide a nonstagnant membrane area environment with effective sinusoidal meandering turbulence to the boundary layer 3805 area, settling of suspended particles thus inhibited.

Feed activated hydrodynamic impulse system 3501 is best illustrated in FIGS. 13 through 15. A pulsating high pressure water jet is receive from plunger pump 2907/2911 through inlet port 3503 through lower retainer ring 3504 and feed ring-room housing 3505 at lower section 3506. Housing 3407 holding filter module 3405 is ported as required for feed input and concentrate and permeate output and is constructed accordingly. Upper section 3601 (FIG. 14) includes permeate discharge connector 3603, upper retainer plate 3605, spring rings 3606, bolt retainer plate 3607, spring adjustment plate 3609, return spring 3611 and lantern ring 3613. Variously sized o-rings seals 3615 seal the unit. Membrane coupling 3617 couples connector 3603 to membrane 3405.

Lower section 3506 (FIG. 15) further includes permeate tube plug 3703, ring piston 3705, retentate discharge connector 3707, and spring rings 3709 and 3711. Again, various sized o-rings 3713 seal the apparatus. As can be appreciated the pulsating jet of water received through port 3503 vibrates module 3405 at ring piston 3705 at the rate of pulsation. Reciprocation is limited and maintained by spring 3611 operating against ring 3613 (held in adjustment by adjustment plate 3609).

Figure 17:
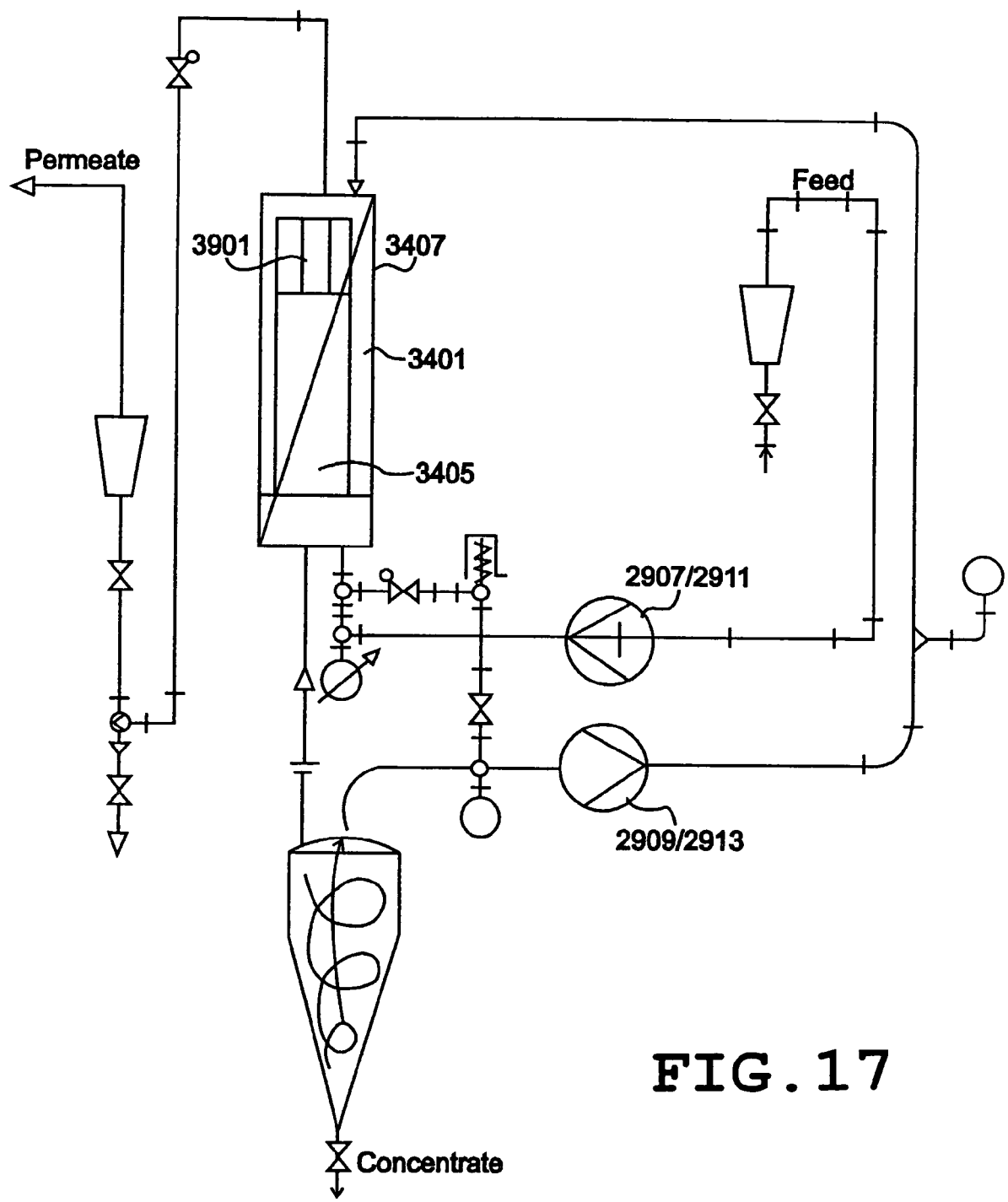
FIG. 17 is a diagram illustrating an alternative deployment of the oscillating membrane system of FIG. 13.
Figure 18:
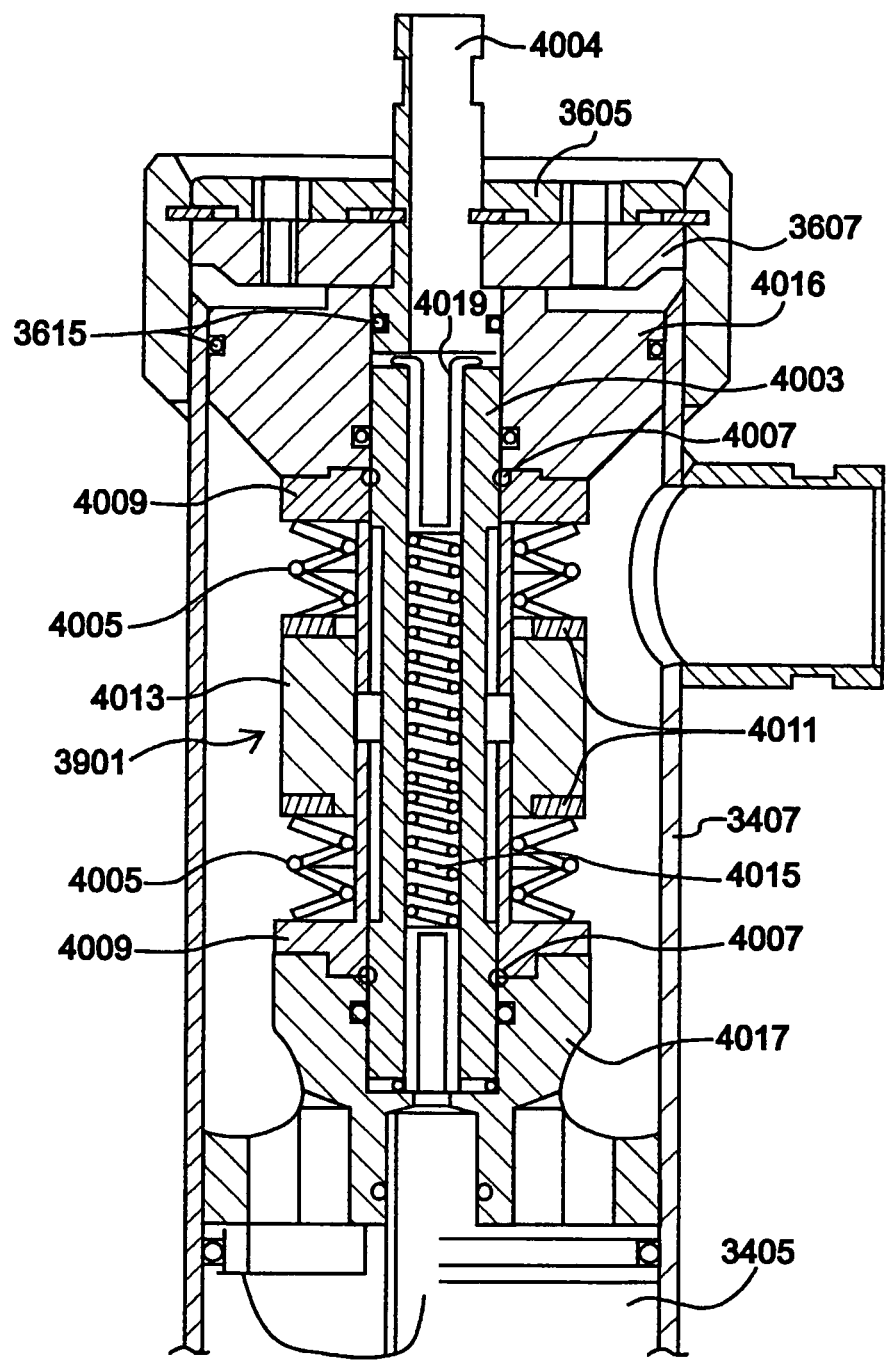
FIG. 18 is a sectional illustration of a vibratory seal arrangement for the oscillating membrane system of FIGS. 13 and 14.

Self-contained, vibratory spring, seal and transfer conduit apparatus and methods, in accord with yet another aspect of this invention, are illustrated in FIGS. 17 and 18. The self contained, vibratory spring, seal and transfer conduit apparatus and methods of this invention provide a flexible sealing connection between an oscillating and a stationary object by means of a fluid conveying elastomeric conduit connection. The flexible fluid conveying conduit is equipped with non-flexing end connectors to provide motionless sealing surfaces for the associated o-ring seals which are housed in the respective objects. As a result, positive nonreciprocating sealing in a dynamic operating environment is provided.

Self contained apparatus 3901 is adapted for (but not limited to) use with vibrating membrane technology of the type shown herein in FIG. 13 (and numbers therein common to both embodiments are carried forward). Apparatus 3901 is preloaded under tension by a polyurethane based permeate transfer conduit 4003 (also referred to herein as polyurethane spring conduit 4003). The material used has a durometer of about 60A and has high rebound values (greater than 65%) sufficient to withstand high frequency vibrations. The materials is selected to have high load bearing properties in both tension and compression). All machine elements thus remain in alignment and remain stationary (relative to one another) thereby preserving sealing surfaces while the vibratory load is operating.

Springs (preferably Belleville or disc springs) 4005 generate a portion of the compressive force counter reacting the tension load of polyurethane spring conduit 4003. Pre-load retainers 4007 preferably stainless steel retainer rings or spring clips) contain and secure preload, connecting urethane spring conduit 4003 with the upper and lower load guides 4009. Springs 4005 are held between upper and lower load guides 4009 and center load guides 4011, load transfer spacer 4013 spanning center guides 4011 spacing the two spring columns (formed by a spring 4005 and one each of load guides 4009 and 4013). This arrangement equally distributes the low value tension and compression loads.

Spring 4015 further supports polyurethane spring conduit 4003. Conduit 4003 is mounted at the upper end with a modified plate 4016, abutting modified permeate discharge connector 4004, and at the lower end to a modified lantern ring 4017. Load transfer spacer 4013 has a length selected so that maximum urethane spring conduit 4003 deflection is less than 2%. Urethane spring manufacturers suggest a maximum deflection of 25% and a maximum cycle rate of 700 cycles per hour for intermittent operation. For continuous operations and a maximum deflection of 15%, a maximum cycle rate of 12,000 cycles per hour is suggested. Because apparatus such as apparatus 3901 has a cycle rate of between 216,000 and 648,000 cycles per hour, the deflection percentage needs to be significantly reduced.

Apparatus 3901 provides wear and leak-free operation for permeate fluid transfer between oscillating membrane element 3405 and its stationary housing 3407 components, thus effectively avoiding contamination of the produced permeate with feed water. Apparatus 3901 accommodates either high frequency membrane separation housing designs (side port entry and the top port entry) and serves as a return spring for apparatus 3401 as well as a permeate transfer conduit and seal unit. Modular design accommodates ease of maintenance.

On the lower side of apparatus 3901, lower spring 4005 column oscillates simultaneously with the module 3405, while at the upper side of apparatus 3901 upper spring 4005 column remains steadier so that the connecting end of conduit 4003 remains motionless in its sealing seat 4019. This is due to the return spring pressure acting upon the upper retainer which keeps the upper male connecting end securely in its sealing seat.

Figure 19:
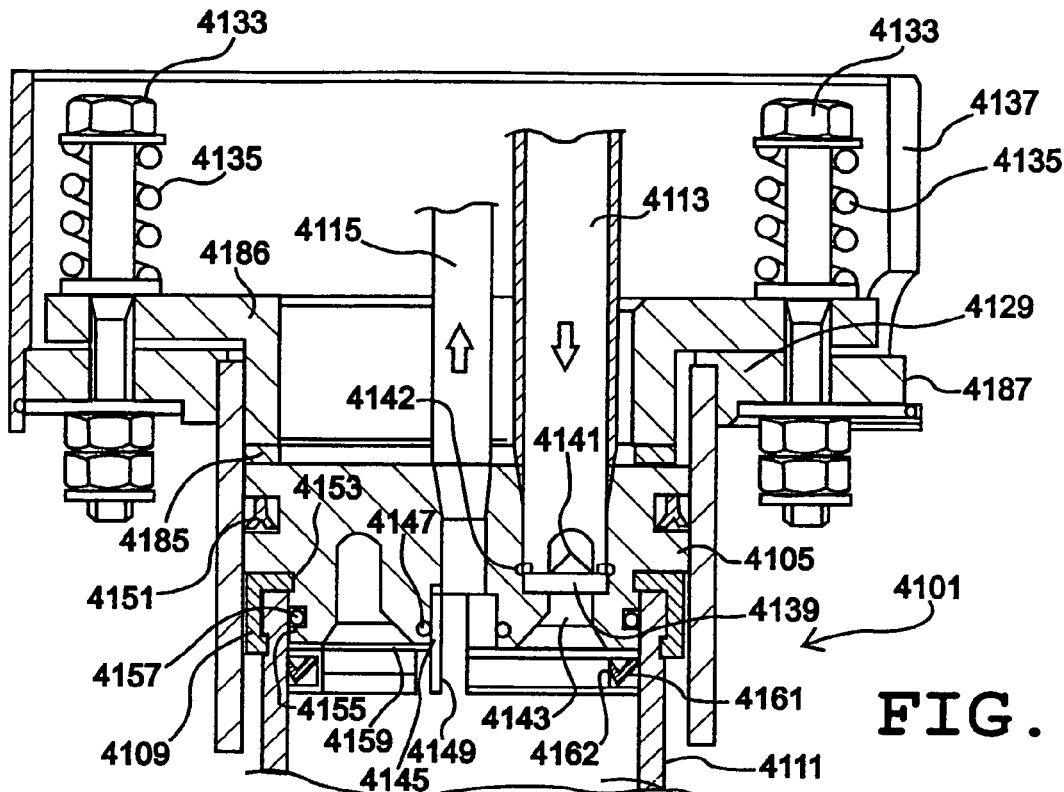
FIG. 19 is a sectional illustration of a high shear embodiment of the oscillating membrane system of FIGS. 12 through 17.
Figure 19:
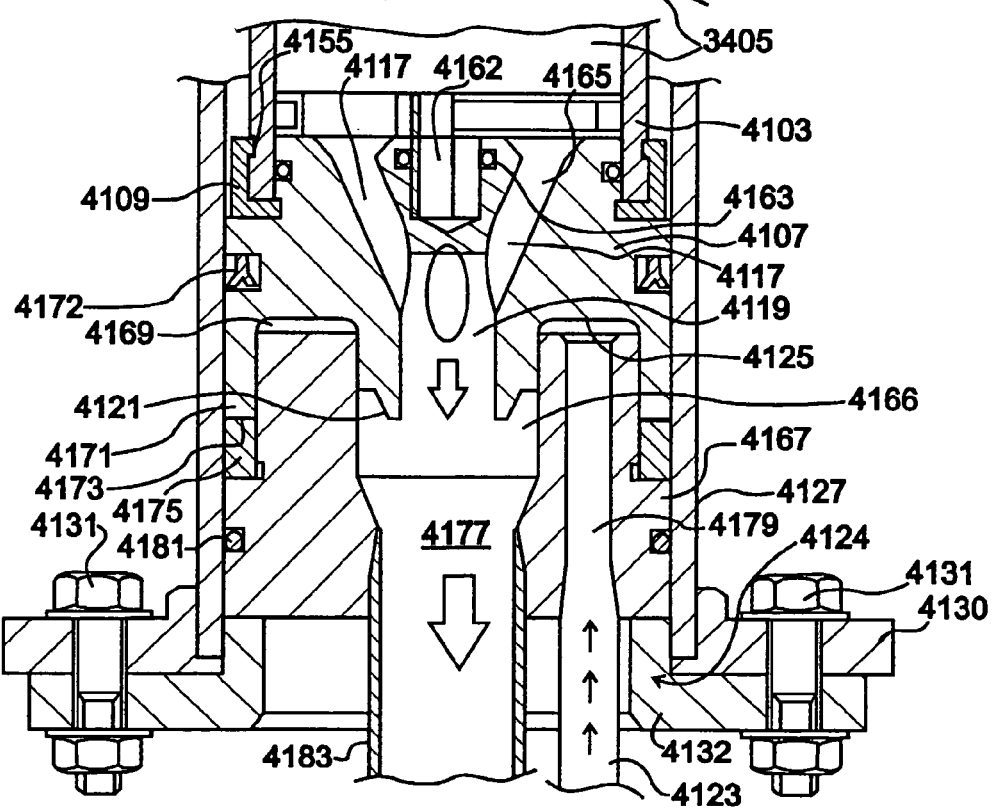
Figure 20:
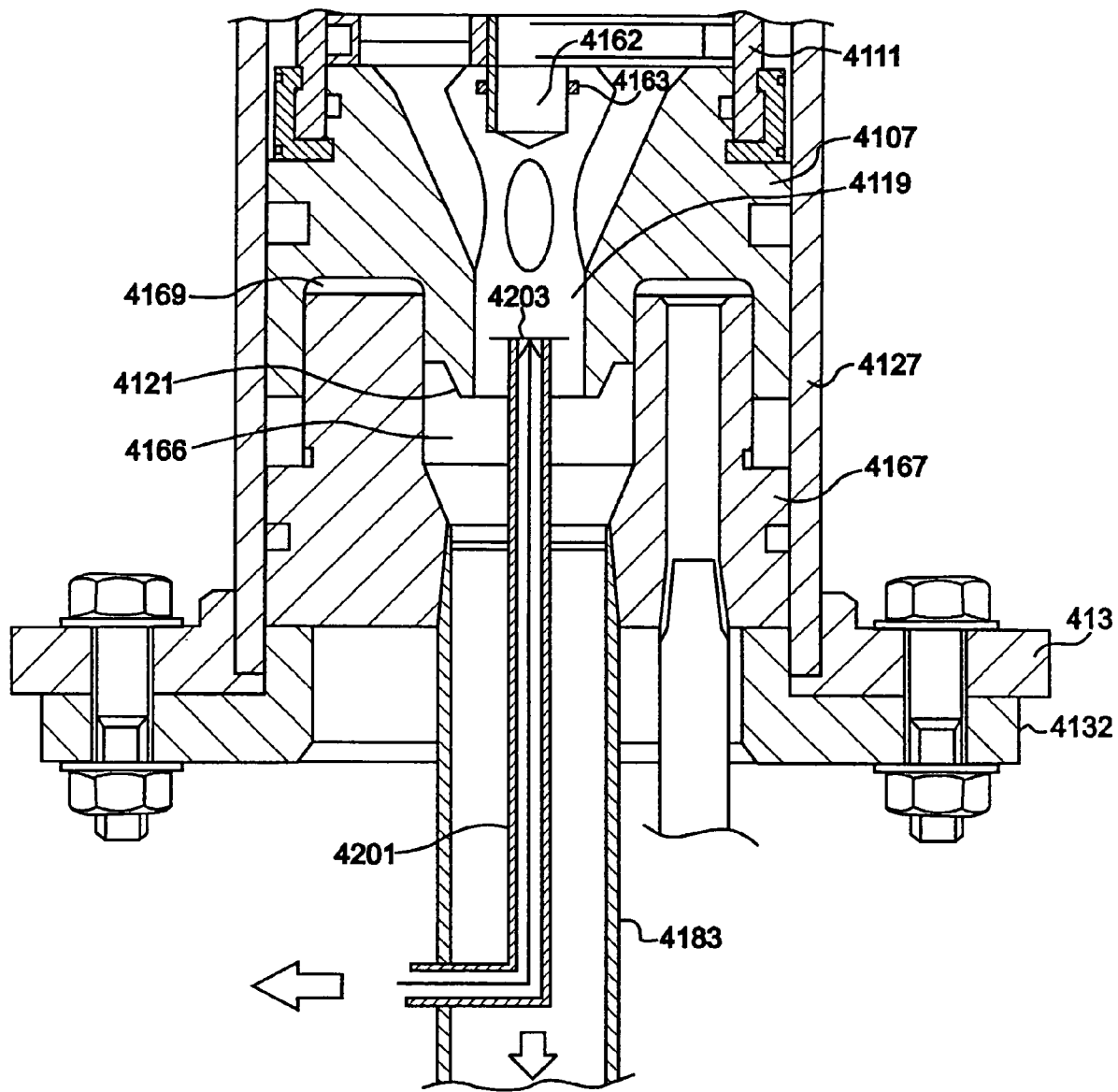
FIG. 20 is a sectional illustration of a draw-off utilizable in the high shear embodiment of FIG. 19.

In accordance with yet another aspect of this invention, FIGS. 19 and 20 illustrate a high shear and high amplitude internal membrane separation apparatus and methods. This invention relates to permeate continuity in water treatment processes. More particularly, the purpose of this aspect of the invention is to achieve high shear in such processes to increase permeate continuity while treating high load of colloidal and slimy matter (polysaccharide, etc.) in treatment station feed water.

Apparatus 4101 illustrated in FIG. 19 offers high shear operation for internally vibrating membrane separation systems of the types heretofore disclosed. This high shear option is provided by means of a high vibration amplitude in the range of $\frac{1}{32}$" to $\frac{3}{8}$". However, such high amplitude vibration could damage membrane element 3405. Thus, in accord with this invention, an all-surrounding membrane support tube 4103 with upper and lower connecting end pieces 4105 and 4107 which are rigidly coupled and locked to support tube 4103 by split tongue and groove rings 4109 are provided, thus converting membrane element 3405 into membrane cartridge 4111 having element 3405 therein. Membrane cartridge 4111 provides a backlash free, non-load bearing and non-force transmitting, hardened operating environment for membrane element 3405.

End pieces 4105 and 4107 also provide means for membrane fluid transfer. Upper end piece 4105 has two conduits 4113 for crossflow feed influent and 4115 for produced permeate effluent. Lower end piece 4107 has multiple inclined conduits 4117 (at least four conduits for smaller membranes) all merging into large retentate effluent conduit 4119 of venturi nozzle 4121. Nozzle 4121 has an outside cone angle of about 21° to support venturi function and enhance rapid transfer of the pulsating, make up feed flow at elevated operating frequencies. High pressure vibrating pulsating feed input 4123 through lower flange and injector body assembly 4124 is positioned to operate against surface 4125 of lower end piece 4107 to vibrate cartridge 4111.

Overall, a containment housing 4127 is welded to transfer flange assemblies 4129 (upper) and outer flange 4130 of assembly 4124, the lower flange assembly bolted together by bolt and nut sets 4131 through lower inner flange 4132 and outer flange 4130 of assembly 4124. Upper flange assembly is bolted together with bolt and nut sets 4133 having recoil springs 4135 thereover for recoil adjustment. Safety guard 4137 is mounted at the top of apparatus 4101 and includes a window for on-site amplitude inspection.

The structural integrity of the membrane element 3405 needs to be strong enough to sustain its own vibratory mass acceleration forces within its hardened enclosure. To provide maximum structural membrane element strength, the preferred spirally-wound membrane element design for all high frequency membrane separation applications in high shear mode includes fiberglassed outside for holding element 3405 together. However, amplitudes greater than 3/8" are not recommended for the spirally-wound membrane elements under any circumstances since adhesive membrane joints fatigue prematurely at higher operating frequencies (60 Hz).

Apparatus 4101 allows operation of vibratory membrane implementations at higher shear at moderate frequency (20 to 60 Hz). Membrane cartridge 4111 is relatively light and vibrates internally at an adjustable up to a relatively high frequency within housing 4127 (rather than vibrating the entire heavy membrane module as is common in conventional vibratory membrane separation processes).

A primary application for this high shear option for high frequency membrane separation systems is the effluent treatment of dewatered electrocoagulation sludge. This is an important treatment step whenever a required electrocoagulation process generates sludge and the produced sludge requires dewatering prior to disposal. Any other application where an elevated shear energy requirement for treatment of a specific feed water is diagnosed would benefit from use of apparatus 4101.

A secondary application for this high shear option exists where electrocoagulation pre-treatment is abandoned in favor of standard nanofiltration treatment. This will produce a concentrate having colloidal loading too high for standard low shear high frequency membrane separation processes. Yet another application occasioned in any circumstance where limited disposal options are present in extreme high flow yield (high concentration factor) treatment setting.

End pieces 4105 and 4107 are preferably machined out of any suitable material such as metal alloys or engineering plastic materials (selected to keep the vibratory mass low). To minimize an unbalanced, one-sided, membrane feed flow channeling, antichanneling flow distribution plug 4139 having splash dome 4141 blocks direct throughflow and guides the feed flow into ring room flow distribution channel 4143 defined at end piece 4105. Splash dome plug 4139 rests on a shoulder in the lower section of feed conduit 4113 and is secured in its upper position by stainless steel retainer ring 4142. A flared fluid transfer opening from ring room 4143 faces towards the anti-telescoping device at the lead end of membrane element 3405.

Step bore 4145 in end piece 4105 seals (at o-ring 4147) the upper end of permeate collection tube 4149. The outside of upper end piece 4105 includes groove structures, the first to receive upper reciprocating groove ring seal 4151 to seal the upper portion of membrane cartridge 4111. A second high and shallow groove 4153 receives the overlapping split tongue ring 4109 (connectable at its other end in groove 4155 of tube 4103. The split tongue ring halves can be held together by dual spring rings or other suitable means. O-ring 4157 seal upper end piece 4105 and support tube 4103.

To take up axial slack and minimize movement of membrane element 3405 within its all-surrounding enclosure, shims can be added to flow distribution and screen plate 4159 sandwiched between upper end piece 4105 and the anti-telescoping device at the lead end of membrane element 3405. (and where applicable, at the permeate collection tube). Membrane element backlash is thus virtually eliminated.

Plate 4159 provides the necessary pressure drop for proper crossflow feed distribution around the feed ring room. In conjunction with anti channeling flow distribution plug 4139, plate 4159 minimizes localized feed channeling, thus utilizing more efficiently the available membrane area for diffusive fluid transfer. Plate 4159 also acts as a crossflow pump discharge filter screen to catch any particles and foreign objects.

Support tube 4103 can be made from a thin-walled metal alloy a heavier walled, suitable plastic material in order to reduce the vibratory mass. Support tube 4103 is grooved at it bottom end (at 4155) to provide a connection sites for tongue and groove ring 4109 thereat. U-cup seal gasket 4161 is placed around the outside (in a concentrate seal holder 4162) of the lead end of the membrane element 3405. This gasket seals membrane element 3405 to external support tube 4103 and prevents the crossflow feed influent from bypassing the membrane element.

Downstream, membrane element 3405 is equipped with an anti-telescoping device that is connected to lower end piece 4107 by means of the extended lower end of its permeate collection tube 4162. Tube 4162 is sealed at o-ring 4163 at lower end piece 4107. Lower end piece 4107 itself is rigidly coupled and sealed to support tube 4103 in the same manner as upper end piece 4105. The top face of lower end piece 4107 is equipped with a tapered, shallow ring groove 4165. Groove 4165 collects and distributes concentrate/retentate fluid through multiple inclined fluid transfer conduits 4117 which are distributed around groove 4165.

Protruding venturi nozzle 4121, is fitted in inlet chamber 4166 which is defined by injector body 4167 of assembly 4124 protruding into lower end piece 4107 leaving a small ring room 4169 adjacent surface 4145 of end piece 4107 for the distribution of the high pressure, pulsating make up feed flow. Venturi nozzle 4121 has an effective sealing length equivalent to the maximum operating amplitude.

End piece 4107 has a dual purpose concentric guide shroud 4171 providing a close fit concentricity between the axially vibrating lower end piece 4107 and non-vibrating injector body 4167. Shroud 4171 defines a reasonable operating clearance between end piece 4107 and external housing 4127 to ensure proper operation of reciprocating seal 4172 sealing housing 4127 and vibrating membrane cartridge 4111 from potential fluid loss. Shroud 4171 also provides impact surface 4173 contacting amplitude regulating impact ring 4175. Ring 4175 is preferably made from polyether-based urethane (60 on the Shore A scale), providing shock deadening. Ring 4175 is configured and positioned for highly resilient operation providing quick recovery in high-frequency vibration applications (rebound values from 50 to 70%).

Vibration amplitude ranges can be regulated by ring height selection. An increase in ring height increases the volume of the distribution ring room 4169 while reducing the effective height of the cylindrical shaped section of nozzle 4121.

In operation, the unchanged volume of the displacement stroke of high pressure piston pump (2907 or 2911, for example, in FIG. 7) first fills the volume of ring room 4169 with feed liquid before it starts to initiate an axial, upward movement of membrane cartridge 4111. Once the cartridge travel upwards and exceeds the reduced height of the outer diameter of nozzle 4121, a fluid transfer passage around nozzle 4121 (from ring room 4169 to chamber 4166) opens and passes the liquid which then flows by the 21° cone-shaped end of nozzle 4121 of lower end piece 4107. Consequently, the feed flow through this transfer passage is entrained and carried along by the venturi effect of the concentrate/retentate discharge and is subject to the priming suction of the crossflow recirculation pump (2909 or 2913, for example, in FIG. 7).

Injector body 4167 is also preferably a unitary structure, machined, for example, from either suitable metallic alloys or plastic material. Injector body 4167 has large conduit 4177 and smaller conduit 4179, conduit 4177 for transfer of concentrated retentate and the pulsating, make up feed influent to crossflow recirculation pump as discussed hereinabove. Conduit 4179 is the input for the vibration inducing feed. Injector body 4167 is sealed at outer housing 4127 with o-ring 4181. Camber 4166 tapers down at conduit 4177 to funnel the flow into recirculation suction connector pipe 4183 maintained through inner lower flange 4132.

Injector body 4167 is positioned and kept in place inside external housing 4127 by flange 4132. The weldment of flange 4130 and housing 4127 could be replaced by an integral structure such as a pipe spool. An upper impact and buffering ring 4185 (made from a polyurethane material) is located between upper end piece 4105 and upper inner flange 4186 of flange assembly 4129 (the weldment of flange 4187 of assembly 4129 to housing 4127 could also be replaced by an integral structure such as a pipe spool).

While not preferred, a potentially useful alternative draw off arrangement for apparatus 4101 as illustrated in FIG. 20 could be utilized. This arrangement provides secondary retentate conduit 4201 in conduit 4183 and through injector body 4167 and chamber 4166 defined by lower end piece 4107 so that its inlet 4203 resides above venturi nozzle 4121 in conduit 4119. In this way draw off received through cartridge 4111 can be at least partially segregated from mixed retentate and feed received during operations from ring room 4169.

As may be appreciated from the foregoing apparatus and methods are provided for mechanical (motorized or hydrodynamic) axial vibration in membrane separation treatment of effluents wherein use of readily available, membrane elements and/or modules is accommodated. The apparatus can be mounted so that membrane modules are maintained in a vertical flow gravity assisted position, and adjustable crossflow operation may be utilized.

What is claimed is:

1. A membrane separation apparatus utilizing vibration of a membrane module having an axial dimension for treatment of effluents flowed through said apparatus by means of fluid ports, said apparatus comprising:
   a membrane support structure having the membrane module receivable therein and including an adjustment plate at an upper section thereof and a retainer ring having at least a first port therethrough at a lower section thereof; and
   vibrating means associated with said support structure for hydrodynamically activating vibration of the membrane module along the axial dimension in said support structure, said vibrating means including a fluid pump and a spring, said fluid pump connected with said first port and said spring located in said support structure between said adjustment plate and location of the membrane module.

2. The membrane separation apparatus of claim 1 further comprising
   a separation membrane element at the membrane module having an axial dimension,
   and wherein said
   fluid pump transmits fluid pulses hydrodynamically oscillating said membrane element in said axial dimension in said support structure.

3. The apparatus of claim 1 further comprising fluid ports located at said membrane support structure and crossflow pumping connected with said support structure.

4. The apparatus of claim 3 wherein said support structure includes a membrane housing, wherein said fluid ports are located at said membrane housing.

5. The apparatus of claim 1 wherein said support structure includes a tube for receiving and securing said membrane element, said tube and element together defining the membrane module, said tube axially mounted in a containment housing and movable axially therein by said vibrating means, fluid ports located at said containment housing.

6. The apparatus of claim 5 wherein said pump is adapted to provide a pulsating flow to said containment housing through one of said ports.

7. The apparatus of claim 1 wherein said spring is maintained at a seal and transfer conduit providing fluid transfer through said apparatus.

8. The apparatus of claim 1 further comprising a piston structure slidably retained at one section of said support structure, one end of the membrane receivable adjacent thereto.

9. A membrane separation apparatus utilizing vibration of a membrane module having an axial dimension for treatment of effluents flowed through said apparatus by means of fluid ports, said apparatus comprising:
   a membrane support structure having the membrane module receivable therein and including an adjustment plate at an upper section thereof and a retainer ring having at least a first port therethrough at a lower section thereof; and
   vibrating means associated with said support structure for hydrodynamically activating vibration of the membrane module along the axial dimension in said support structure.

10. The apparatus of claim 9 wherein said support structure includes a housing having said upper and said lower sections for retention of the membrane module.

11. The apparatus of claim 10 further comprising a piston structure maintained at one end of the membrane module, said piston structure receivable at said lower section of said housing, said vibrating means activating said piston structure in said housing.

12. The apparatus of claim 9 wherein said vibrating means including a spring maintainable between said ring and said plate.

13. The apparatus of claim 9 further comprising crossflow pumping connected with said support structure.

14. The apparatus of claim 9 further comprising a piston structure in said support structure for oscillatory vibration of the membrane module responsive activation by said vibrating means.

15. A membrane separation apparatus utilizing vibration of a membrane module having an axial dimension for treatment of effluents flowed through said apparatus, said apparatus comprising:
   a membrane housing including an adjustment plate at an upper section thereof and a retainer ring having at least a first fluid port therethrough at a lower section thereof, the membrane module receivable therein;

a piston structure slidably retained in said lower part of said housing, one end of the membrane module receivable adjacent thereto, said piston structure between said first fluid port and the module;

a ring structure slidably retained in said upper part of said housing, an opposite end of the membrane module receivable adjacent thereto, said ring structure between said adjustment plate and the module;

a spring maintained in said housing between said ring structure and said adjustment plate; and a fluid pulsing pump for pulsating a high pressure water jet connected at said first fluid port of said housing.

16. The apparatus of claim 15 wherein said housing included a feed input and concentrate and permeate outputs.

17. The apparatus of claim 15 wherein said pump is a plunger pump.

18. The apparatus of claim 15 further comprising a feed ring-room housing as said lower section of said housing between said retainer ring and said piston structure and having said first fluid port therethrough.

* * * * *